(12) United States Patent
Sample et al.

(10) Patent No.: US 10,326,535 B2
(45) Date of Patent: Jun. 18, 2019

(54) COMMUNICATION THROUGH MODULATED ELECTROMAGNETIC EMISSIONS

(71) Applicant: DISNEY ENTERPRISES, INC., Burbank, CA (US)

(72) Inventors: Alanson Sample, Pittsburgh, PA (US); Chouchang Yang, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/799,896

(22) Filed: Oct. 31, 2017

(65) Prior Publication Data

US 2019/0132058 A1     May 2, 2019

(51) Int. Cl.
*H04B 13/00*     (2006.01)

(52) U.S. Cl.
CPC .................. *H04B 13/005* (2013.01)

(58) Field of Classification Search
CPC .................................................. H04B 13/005
USPC ............................................................ 375/295
See application file for complete search history.

(56) References Cited

U.S. PATENT DOCUMENTS

| | | | |
|---|---|---|---|
| 2011/0161537 A1* | 6/2011 | Chang | H04L 27/00 710/107 |
| 2016/0259432 A1* | 9/2016 | Bau | H04W 4/023 |

* cited by examiner

*Primary Examiner* — Lihong Yu
(74) *Attorney, Agent, or Firm* — Marsh Fischmann & Breyfogle LLP; Kent A. Lembke

(57) ABSTRACT

Touch-based communication between users and various electronic devices is provided by encoding data onto the device's EMI. When the device is touched by a user, the data encoded EMI signal travels through their body and into a radio receiver worn by the user, such as via a wrist band. Results show that electronic primitives such as LEDs, buttons, I/O lines, LCD screens, motors and power supplies can be turned into radio transmitters capable of touch communication. Effective data rates range from 5.8 Kbps to 22 bit per image depending on the primitive used.

34 Claims, 20 Drawing Sheets

LED EMITTING EME

PWM FREQUENCY & EME DATA

WRISTBAND

TOUCH TO READ EME DATA

WRISTBAND - EXPLODED VIEW

WRISTBAND-COMPONENT DIAGRAM

COMMUNICATION THROUGH MODULATED ELECTROMAGNETIC EMISSIONS

BACKGROUND

The need to connect wirelessly to our electronic gadgets and devices is becoming pervasive and will only increase as we move closer to realizing the internet of things, smart homes, and smart cities. However, the cost and complexity of adding active radio transmitters to toys, simple electronics, and appliances is prohibitive and limits many creative and interactive experiences.

One of the easiest ways of adding wireless communication capability to an object is sticking an RFID tag on it. While this is effective, the cost is not negligible as secure tags cost over ~23 cents plus encoding fees, which make a significant portion of the BOM for low-end toys. Furthermore RFID tags are fixed function devices that can only report their ID and cannot send arbitrary data.

It is against this background that the techniques described herein have been developed.

SUMMARY

Disclosed herein is a method that includes: providing an electronic device that emits an electromagnetic noise emission frequency pattern; modulating the electromagnetic noise emission frequency pattern emitted by the electronic device, wherein the modulation is representative of information to be communicated to a user; and the user receiving the modulated electromagnetic noise emission frequency pattern emitted by the device.

The user may receive the information represented by the modulated electromagnetic noise emission frequency pattern. The user may wear a receiver on the user's wrist that receives the modulated electromagnetic noise emission frequency pattern. The receiver may be part of a wristband that has one or more electrical conductors in direct contact with the user's skin. The information may include information about the electronic device. The information may include information associated with an image displayed by the electronic device.

The electronic device may include a display. The electronic device may be a display. The electronic device may include an electrical motor. The electronic device may be a switched-mode power supply. The electronic device may be an LED.

Also disclosed is a method that includes: providing an electronic device that emits an electromagnetic noise emission frequency pattern; modulating the electromagnetic noise emission frequency pattern emitted by the electronic device, wherein the modulation is representative of information to be communicated to a user; and the user receiving the modulated electromagnetic noise emission frequency pattern emitted by the device via a wrist-borne receiver with one or more electrical conductors in direct contact with the user's skin; and the user extracting the information represented by the modulated electromagnetic noise emission frequency pattern.

The information may include information about the electronic device. The information may include information associated with an image displayed by the electronic device. The electronic device may include a display. The electronic device may be a display. The electronic device may include an electrical motor. The electronic device may be a switched-mode power supply. The electronic device may be an LED.

Also disclosed is an electromagnetic emissions receiver worn by a user to receive encoded information from a nearby electronic device. The receiver includes one or more electrical conductors in direct contact with the user's skin; a radio receiver conductively coupled to the one or more electrical conductors to receive radio waves that are electromagnetic noise emissions emitted as a consequence of the operation of an electronic device the user is in physical contact with; and a controller that processes the received radio waves to extract information encoded in the radio waves by the electronic device.

The one or more electrical conductors, the radio receiver, and the controller may be included in a wristband worn by the user. The controller may communicate with a portable communication device carried by the user so that the extracted information can be displayed for the user.

The information may include information about the electronic device. The information may include information associated with an image displayed by the electronic device. The electronic device may include a display. The electronic device may be a display. The electronic device may include an electrical motor. The electronic device may be a switched-mode power supply. The electronic device may be an LED.

BRIEF DESCRIPTION OF THE DRAWINGS

FIGS. 2a-2e provide a System Overview, in which: FIG. 2(a) shows a microcontroller emitting electromagnetic noise on a GPIO pin; FIG. 2(b) shows the EMI toggling between two different PWM frequencies, which generates two different EMI waveforms; FIG. 2(c) shows a receiver in wearable wristband form factor; FIG. 2(d) shows the user touching the microcontroller and the EMI signal passing along the user's hand into the wristband; and FIG. 2(e) shows the receiver computing the FFT of the data and checking the frequency bins corresponding to a logical "0" and a logical "1."

FIGS. 4a-4c show the user touching various microcontroller-based primitives, while

DETAILED DESCRIPTION

Figure 1:
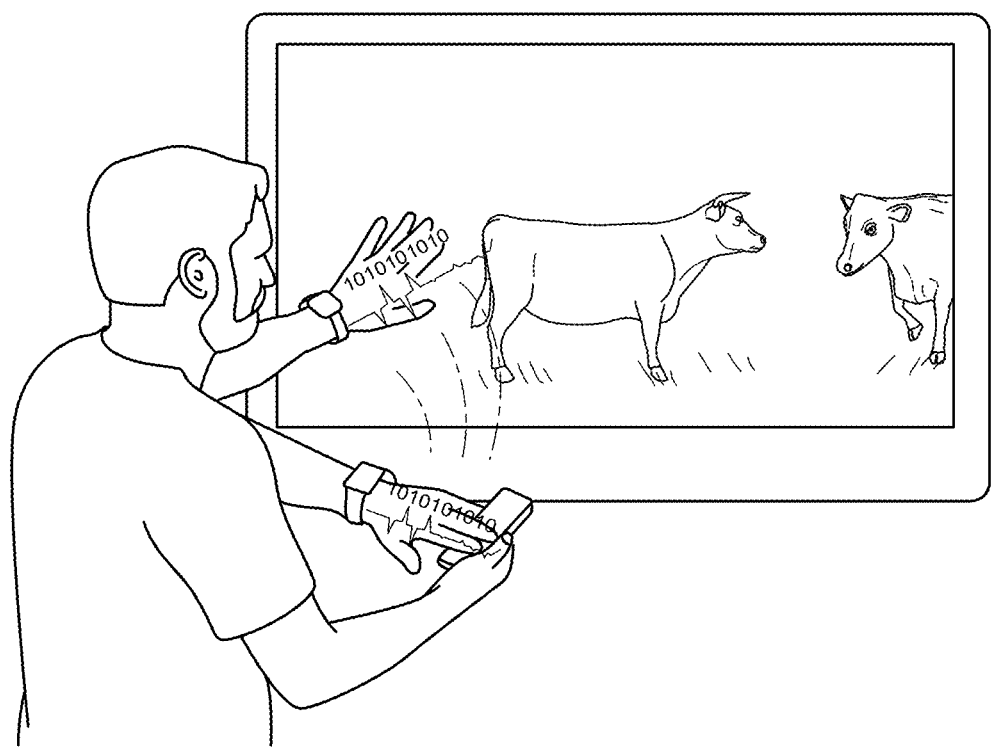
FIG. 1 shows a user receiving electromagnetic noise from an LCD display screen and transfer of the data to a wristband device for decoding and then transferring data to his smart phone.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that RFID techniques are not the only manner of receiving RF (or other forms of electromagnetic) energy from a device. Nearly all electronic devices produce some form of unintended electromagnetic emissions (EME) due to the normal operation of their circuitry. This is a fundamental outcome of Maxwell's equations, which predict that any time-varying current will produce electromagnetic radiation. Typical circuit components that produce strong sources of EME include oscillators, digital clocks and I/O lines, switch mode power supplies, and motors, which each emit a large central tone and higher order harmonics.

In order to insure that these unintended emissions do not interfere with traditional radio transmission systems such as TV, Wi-Fi, and cellular services, governmental regulations have been adopted that strictly limit the magnitude of these emissions. In the U.S., the Federal Communication Commission (FCC) has two sets of standards. One set of standards is for conducted emissions between 1 kHz-30 MHz (e.g. EM noise that propagates over power lines), and a second set of standards is for free space radiated emissions between 30 MHz to 10 GHz. These regulations set a hard limit on the amplitude of the EME, but not the form or "modulation" of these signals.

Therefore once a device has met FCC certification allowing it to be marketed and sold in the U.S. there are no restrictions on modulating the preexisting electromagnetic noise. For example, there are no limits on the types of images that can be shown on LCDs screens due to EME regulations, since the data source does not change the magnitude of the emissions generated by the LCD hardware.

Introduction

Effective means of automatically understanding how we interact with and manipulate objects and devices in our daily lives has the potential to enable a wide range of tangible and ubiquitous user interfaces. Many research efforts have focused on observing object interaction detections by embedding sensing and computing devices into objects of interest, which then wirelessly report information back to a host computer for processing. While this works well for a small number of objects in a research setting, it does not easily scale due to the high per unit cost of the sensor nodes, requirement of manually instrumenting each object and issues related to battery maintenance. Furthermore object interaction is only part of the challenge, automatically understanding the state of the device the user is interacting with provides a rich amount of information about the user's implicit and explicit intentions.

Leveraging previous work on tag-less device interaction detection via electromagnetic sensing, we make the following observations: Nearly all electronic devices, regardless of complexity or intended use, are actively transmitting signals in the form of electromagnetic emissions (EME) also commonly referred to as electromagnetic interference (EMI). We believe that these electromagnetic emissions represent an untapped communication channel, that if properly modulated can turn electronic primitives such as LEDs, buttons, I/O lines, LCD screens, motors, and power supplies into radio transmitters capable of touch communication. All that is needed is software to encode base-band data into the EMI. No additional wireless hardware is required.

In order to exploit this capability we have created a simple wrist worn receiver including a single op-amp and microcontroller, with integrated analog-to-digital (A/D) converter (ADC), to capture and interpret the EMI data. By touching a device of interest, date encoded on top of the EMI (using our Spread Spectrum Frequency Shift Keying modulation scheme) is transferred along the user's body and into our smart watch receiver.

In FIG. 1, the video playing on the public display encodes data into the electromagnetic noise generated by the LCD panel's row and column drivers. To retrieve this data, the user touches the LCD screen, which transfers the data along his hand and into the wristband device for decoding. He then transfers that data to his smart phone by touching the phone, which is already paired with his wristband device.

This core communication capability enables a number of interaction scenarios based on touch and physical contact. For instance, FIG. 1 shows a pictorial of a person transferring a movie trailer from a public display to their smart phone by "grabbing" the video from the screen and "placing" it onto their phone. Here the LCD panel emits EMI signals based on the operation of the pixel's row and column drivers. By encoding baseband data as imperceptible variations in contrast in the video stream, the LCD panel transmits EMI data. With a data rate of 10 kbps the movie's meta-data along with a pointer to the video is transmitted along the user's hand and into the wristband device or smart watch. Then the user touches the smart-phone, which is already paired with the wristband device, to complete the transfer. Ultimately, the wristband device allows nearly any electronic device to send arbitrary data payloads through touch, without the need for dedicated radios or hardware modification.

Our work makes the following contributions:

- The use of electromagnetic noise (i.e. EMI) as a carrier signal for data transmission
- Six electronic primitives that can be used for EMI data transmission including: I/O lines, LEDs, Buttons, LCD screens, Motors, and DC-DC power converters
- A Spread Spectrum Frequency Shift Keying modulation scheme for encoding and decoding EMI data
- Two methods for encoding EMI data into video streams that can then be transmitted by LCD screens
- A wearable smart watch architecture that received EMI through the body for and decode EMI data in real time.

Related Works

At its core, the wristband device provides a touch based (i.e. near contact) method for turning electronic devices into radio transmitters without the need for dedicated radio hardware. It is suitable for new devices or existing devices with only software modification. When paired with the wristband receiver it opens up a wide variety of touch based interaction usage scenarios where a device's identity, state information, and/or metadata can be transmitted to the user via touch. Related work can generally be placed in one of three categories: 1) tagging systems where an object/device is augmented with dedicated radio hardware 2) Body Channel Communication where the signals are transmitted along the body often, through touch, and 3) RF and EMI sensing methods for understanding gestures and users' interactions.

Tagging

One standard approach to object interaction detection is to instrument each object of interest with battery powered sensor nodes that use traditional radios (such as Bluetooth or Wi-Fi) to stream data to a host computer to infer object interactions. While this approach can deliver high fidelity streaming sensor data over distances of 10s of meters. It does not allow the user to explicitly control when and with which device to receive data from. Furthermore, it also requires that each device be manually tagged with a relatively high per unit cost (tens of dollars), large size tag that will require manual recharging.

In order to reduce cost and increase the easy of deployment researchers have turned to battery free RFID tags that come in a stick like form factor. These fixed function devices report their unique ID when energized and interrogated by an RFID reader. Near-field RFID tags have been successfully used to make tangible interfaces and Phillips et al, has developed mobile RFID reader bracelets for detection of object interaction and ultimately activity interfacing. Likewise, UHF RFID tags, which have a read range of up to 10 meters, have also been used for object interaction detection and tangible user interfaces. This reduced the need for a handle held or wearable reader by placing UHF RFID readers in the environment. While both these approaches reduce the burden of object/device instrumentation they still require manual tagging and the RFID tags are limited to transmitting their fixed ID as opposed to general-purpose data.

Body Channel Communication

Research on Body Channel Communication (BCC) has focused on using the human body as a medium to transmit data through. Typically, various forms of capacitive coupling are employed to transmit data between wearable BCC transceivers placed on the body, or between a wearable BCC transceiver and BCC node embedded in objects. There are challenges related to ground effects BCC techniques over the ability to not only detect human object interaction events, but also transmit arbitrary data between two. While this works well when dealing with a handful of well-instrumented devices in a controlled environment, the cost and complexity of adding dedicated BCC radios to all the electronic devices that we typically interact with has proven to be prohibitive at scale.

RF and EMI Sensing

The use of existing RF and EMI signals have been utilized in literature to enable a number of HCI applications. Cohn et. al. used the human body as an antenna for receiving RF signals in the home. Here a small electrode was attached to the back of the neck and connected to a backpack-bounded spectrum analyzer. As the user moves around the home, the system inferred user location within a home, as well as detecting different gestures and continuous touch tracking along a wall. A later extension enabled free-space, whole body gestures by utilizing EM Doppler shifts.

Recent work on EMI sensing has shown that it is possible to classify the category of the device a user is touching by measuring the electromagnetic signatures that it emits. Here the EMI signals emitted by the device are passed through the user's body to wristband connect to a software defined radio. Follow on work has shown that it is possible to individually identify instances of a device out of a given population using only the EMI signature. However, in neither case was active data transmission explored.

The closest related work to our wristband device is by Hessar et. al. which uses a fingerprint scanner to capacitively transmit data to a wrist band connected to a software defined radio. Here the fingerprint reader's Active Capacitance Sensing scanner is turned on and off at a rate of up to 50 Hz to encode data. While this work nicely shows the value of sending data through touch and the resulting security implications as related to fingerprint readers, this capacitive coupling method does not scale to a wide range of devices.

FIG. 2 provides a System Overview, in which panel (a) shows a microcontroller emitting electromagnetic noise due to the PWM signal outputted on a GPIO pin. In order to encode data into the EMI the system toggles between two different PWM frequencies, which generates two different EMI waveforms, as denoted in panel (b). The next panel (c) shows our custom designed receiver in wearable wristband form factor. When the user touches the microcontroller the EMI signal passes along their hand and into the wristband, panel (d). Once digitized, the wristband receiver computes the FFT of the data and checks the frequency bins corresponding to a logical "0" in purple and a logical "1" in green, as shown in panel (e).

System Overview

This section provides a general overview of the process of encoding data onto the electromagnetic emissions produced by a device, transferring that signal through touch to the wristband, and the general process for decoding the data. Subsequent sections provide a deeper exploration of the six circuit primitives we have developed that can be used to transmit EME data and the algorithms needed to encode and decode that data, along with applications of this technology.

From physics we know that any time varying current will produce some amount of electromagnetic radiation. For the purposes of this work we are referring to non-ionizing radiation in the form of low frequency radio waves, below 1 MHz. The key concept is that electronic primitives such as digital I/O lines and clocks, oscillators, DC to DC power converters, and motors all give off relatively strong amounts of electromagnetic emissions at the same frequency as the oscillating current.

Figure 2A:
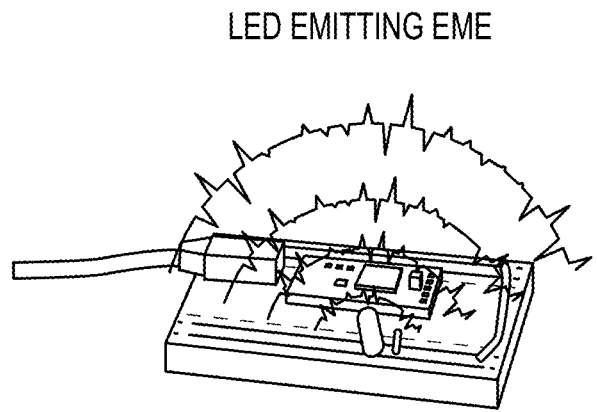

Let's consider the microcontroller development board shown in FIG. 2a, including an ARM Cortex M4 and supporting circuitry. This unmodified piece of hardware can be programmed to emit EME at specific frequencies by toggling one of its GPIO pins with a digital timer. For this example we choose an unloaded I/O pin but, as will be shown later, circuit elements can also be driven in a manner that produces usable EME.

Figure 2B:
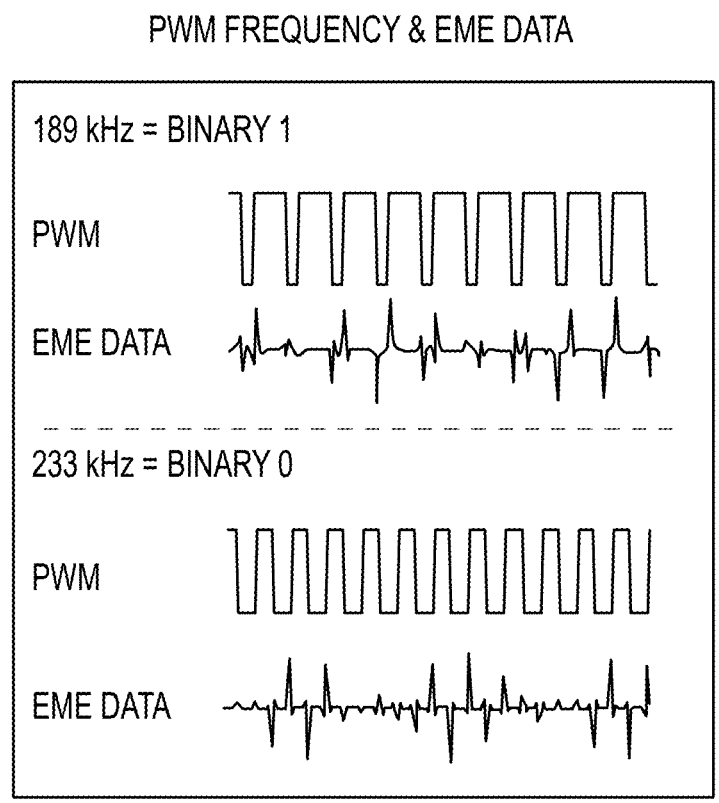

In order to encode data we use a Spread Spectrum Frequency Shift Keying modulation scheme that spreads the data across the frequency domain thereby making it less sensitive to jamming from other sources of electromagnetic interference. For example, FIG. 2b shows two Pulse Width Modulated (PWM) waveforms generated by the MCU and the resulting EME signals in the time domain. The PWM signal switches between 0V and 3.3V. Selecting a rate of 233 kHz with a 50% duty cycle, denotes a logical "0" and a PWM signal of 189 kHz with a duty cycle of 50%, denotes a logical "1". The resulting EME signals can be seen as the derivative of the digital pulses, which makes sense since the rising and falling edges contain most of the high-frequency components (i.e. fastest time varying currents). By switching between these two PWM frequencies, it is possible to modulate the EME to encode arbitrary data. While this particular encoding method works well for most circuit primitives, more sophisticated encoding methods are needed for LCD screens as will be presented in later sections.

Figure 2C:
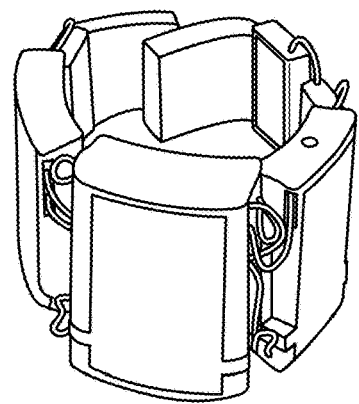

In order to receive the EME data signals emitted by the microcontroller development kit we have developed a self-contained wristband as shown in FIG. 2c. The wristband device includes top and bottom electrodes for coupling to the skin, an analog front-end for signal conditioning and gain, an on-board MCU with 2.3 MHz ADC for digitizing the EME signal, along with an external Bluetooth module and battery.

Figure 2D:
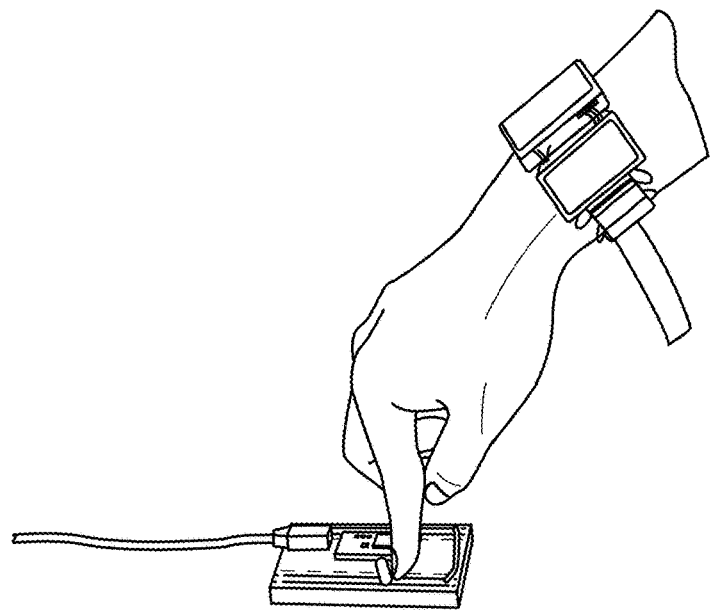
Figure 2E:
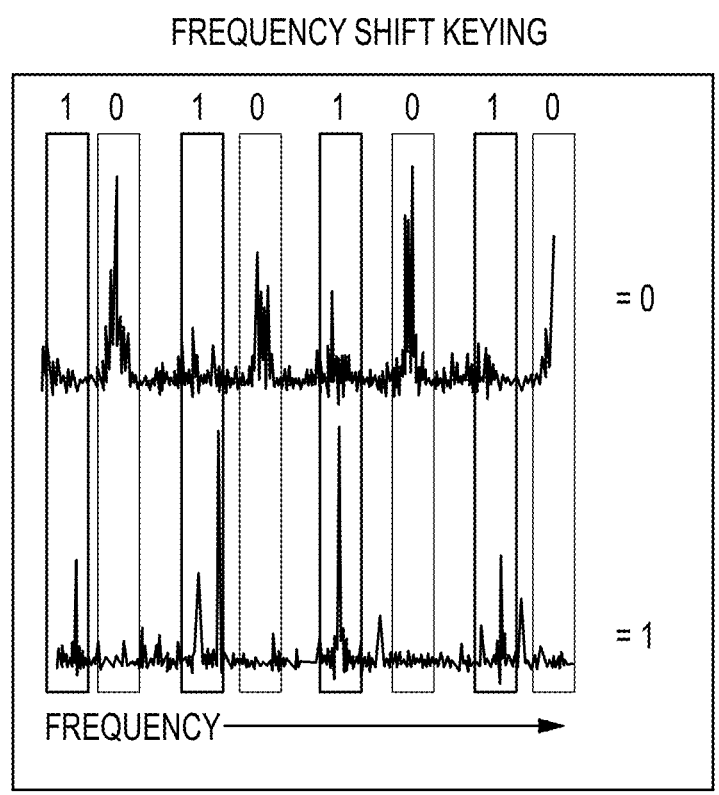

FIG. 2d shows a user wearing the wristband and touching the top of the microcontroller on the develop kit. The EME signal encoded with data is coupled into the user's finger and travels along the hand and into the wristband where it is digitized via the ADC. In order to decode the EME data the MCU on the wristband converts the signal into the frequency domain as seen in FIG. 2e. Due to our Spread Spectrum Frequency Shift Keying modulation scheme, data appears at multiple frequency bins in the frequency domain. By looking for peaks in the "0s" bins (denoted in blue) or the "1s" bins (denoted in red) it is possible to robustly decode the EME data. Typical transfer rates are on the order of 10 kbps.

EM-Comm Wristband Structure

Figure 3A:
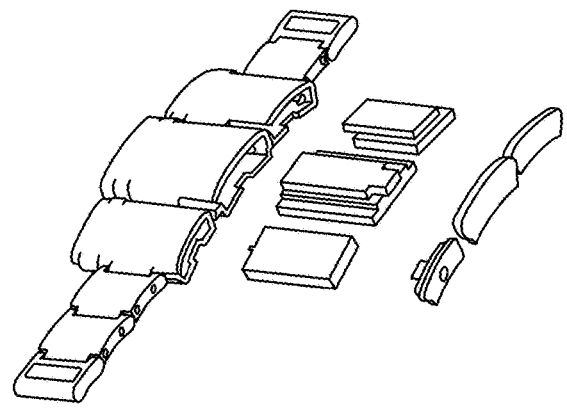
FIGS. 3(a) and 3(b) show componentry in the receiver in the wristband device.
Figure 3B:
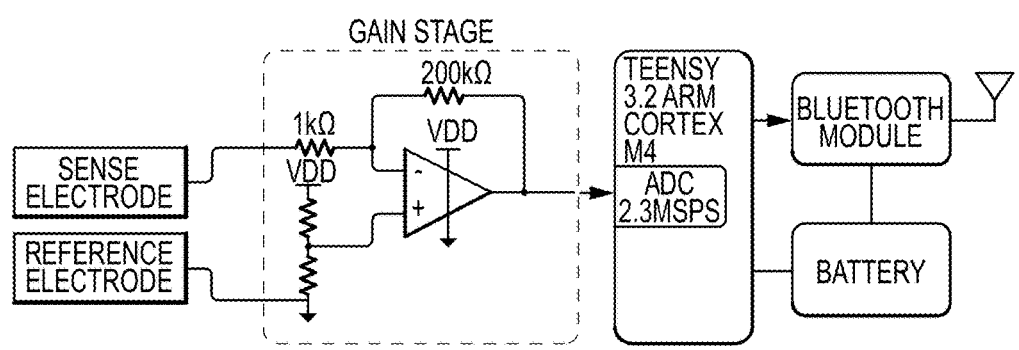

We proposed a wristband system as a receiver to decode the data by capturing EM signals. The wristband includes three main components: Teensy3.2, Bluetooth, and an OPAMP front end circuit as illustrated in FIG. 3a. In FIG. 3b, the EM signals from the sensor port are first amplified via an OPAMP with a gain of 200 and then are sampled at 2.3 MSPS by using the 12 bit ADC in Teensy 3.2 MCU where the CPU uses ARM cortex M4 with the overclock 144 MHz setting. Then, the MCU decodes the EM data by processing the incoming data samples and then sends the decoded result via Bluetooth connection back to the host computer. The Bluetooth module used here is the RN41 Bluetooth chip and the throughput is set at 921 Kbps. Although one can also use the Bluetooth link connection to send the raw ADC samples back to host computer for further processing, Bluetooth is not able to retrieve all the raw sampled data since the 2.3 MSPS sample rate with 2 byte for each sample is beyond Bluetooth throughput. Thus, we implement an on-board decoding algorithm in the wristband device to extract the EME data information and send back the results to host computer via Bluetooth for providing further interaction services.

Primitives-I: LED, Buttons and I/O Lines

Figure 4A:
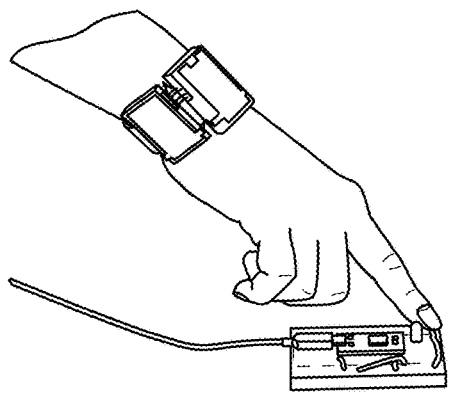
Figure 4B:
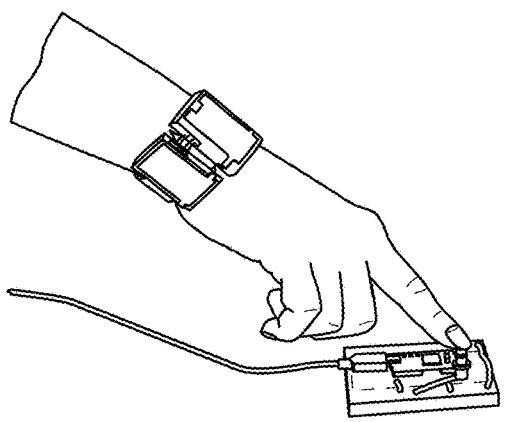
Figure 4C:
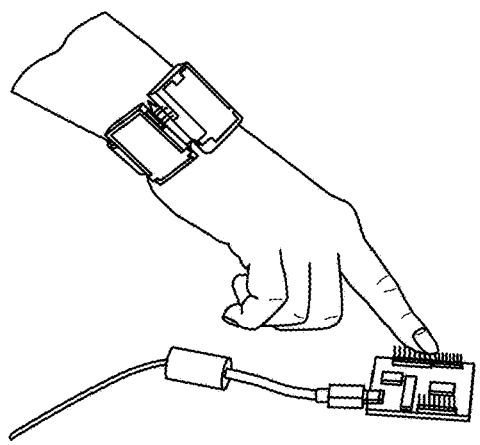
Figure 4D:
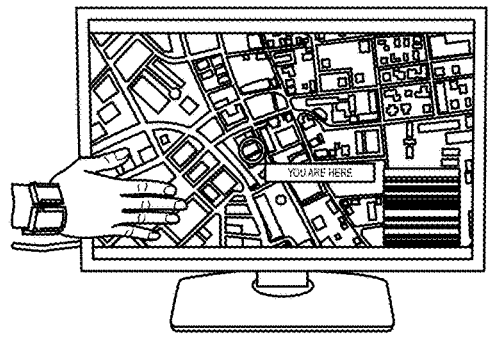
FIGS. 4d-4f show the user touching various other common electronic devices.

All electronic devices emit some amount of electromagnetic noise. As long as it is possible to modulate these emissions between two different states it is possible to encode data into the EME in order to transmit data. In this section, we present three different data transfer mechanisms using six common electronic primitives that are used in our daily lives. They are 1) LEDs, 2) Buttons, 3) I/O lines, 4) LCD Screens, 5) Motors, and 6) Power Supplies. Here, we first introduce the MCU-based primitive: LEDs, buttons, and I/O lines which are peripheral devices that can be controlled by microcontrollers (MCU) to inject the data for our wristband device as illustrated in FIGS. 4a, 4b, and 4c.

LEDs are one of the most common electronic devices in daily life, and their uses range from lighting to indicator purposes. In the case of indicator LEDs, it is often found that they are connected directly to MCU GPIO pins. Similarly, buttons are likewise often found connected to GPIO for gaining user input. Buttons, unlike LED indicators that use the output pins of MUCs, are connected to a pull-up resistor at the input pin of MCUs. The MCUs read the voltage here to identify whether a click action has been made. For example, when the button is not pressed, the default high voltage appears at the input pin. By pressing the button, the input pin is shorted to ground such that the voltage then becomes low. By detecting the presence of the low voltage, the MCUs can respond to the pressed action. I/O lines can be viewed as a line extension from the MCU's GPIO pins. The I/O lines usually are used to connect to peripheral devices such as LEDs and buttons. The I/O line can vary the amplitude to provide control and communication purposes. Therefore, we can leverage the use of digital I/O pins to embed data while providing the original function. The ubiquity of LEDs and buttons, as well as their direct connection to the MCU I/O pins make them uniquely suited to data encoding, with one of the key advantages being that the wires lead directly from the MCU to the exterior of electronic devices. Thus, this permits easy use and extended range.

In one example of the proposed system, a digital output pin can turn on LEDs by setting the voltage high. Human eyes are not able to detect blinking if the switching frequency of this is higher than human perception. Hence, LEDs are able to provide their original functionality as indicators, while additionally sending information for EME based communication. For buttons, using AVR-based MCUs (such as those available from Atmel), the GPIO pins can directly read the voltage status while also providing output on the same pin. Hence, we can directly embed data while still reading the voltage status at the same time. For non-AVR-based MCUs, we leverage the property that the GPIO pin is able to switch between input and output states within several clock cycles. Then, by applying time multiplexing, the MCUs can switch between using the GPIO pin as input and output repeatedly, thus allowing data transfer in addition to detecting button presses. Injecting EM signals in buttons also provide a notification in terms of buttons status for the wristband. When the button is pressed, the voltage is pulled low to ground and so the EM signal emission is also stopped. Then, after releasing the button, the EM signal suddenly appears.

When the wristband observes the fact that the EM signals have abruptly disappeared and then re-appeared, the receiver knows the users have triggered the button's press action. In addition, the disappearing and re-appearing rate of pushing a button is different from putting a hand on the device and then taking it away, so we can use the varying rate to precisely detect the button touching action. In addition, we can also apply the opposite concept to enhance the button detection where a wristband only detects a legitimate button push action when the click action corresponds to the desired number of state changes.

As mentioned, buttons, LED peripherals, and I/O lines are controlled by the MCU digital IO pins. Generally, we can choose two different frequencies, $f_1$ and $f_2$, by choosing two different values of the signal period to represent binary data "1" and "0", where in both cases the switching frequency is faster than human visual perception. The frequencies of the signal's harmonics are dictated by the period, while the duty cycle sets the energy distribution in each harmonic frequency bin. In the next section, we illustrate how to design the desired frequency distribution to maximize the performance.

In FIG. 3 panel (a) shows the mechanical design of the wristband device including a 3D printed body with top and bottom electrodes for coupling to the user. As can be seen, the major internal components of the wristband device (shown here removed from compartments in the wristband device that hold them) are a battery, a microcontroller stacked on top of a high-gain amplifier, and a radio (described from bottom to top). It should be understood that this is but one example of an implementation of the techniques disclosed herein. Along with the microcontroller PCB, battery and Bluetooth radio module, panel (b) shows a schematic of the receiver including an inverting amplifier for signal conditioning, a Cortex M4 microcontroller with 2.3 MSPS ADC, as well as the battery and radio.

In FIG. 4, electronic primitives such as LEDs (a), Buttons (b), I/O lines (c), LCD Screens (d), Motors (e), and Power Supplies (f) emit small amounts of electromagnetic noise that, when properly modulated, can be used to transmit arbitrary data.

Figure 5:
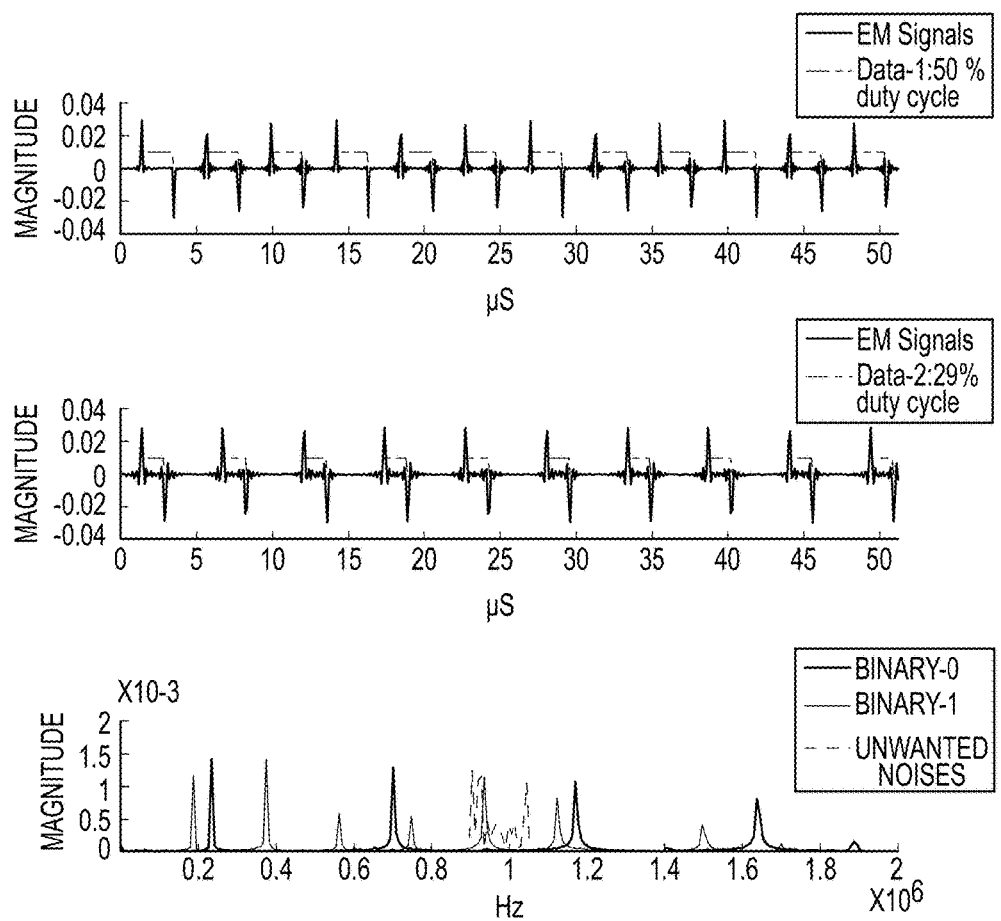
FIG. 5 shows examples of time domain and resulting frequency domain plots of the Spread Spectrum Frequency Shift Keying scheme used to encode data into the electromagnetic noise generated the electronic primitives.

FIG. 5 shows examples of time domain and resulting frequency domain plots of the Spread Spectrum Frequency Shift Keying scheme used to encode data into the electromagnetic noise generated the electronic primitives.

EME Spread Spectrum Frequency Shift Keying Data Encoding

To encode the binary data, we propose a spread spectrum frequency shift keying method by using two different duty cycles and time periods of EM signals. The sender first generates a sequence of EM signals appearing every $T_1$ second to represent binary data "1" while using another EM pulse sequence appearing at every $T_2$ to represent binary data "0". Then, the two different time periods of the EM sequence have two different frequency distributions. With the FFT operation, the receiver can decode the incoming binary data based on its frequency distribution.

Frequency Distribution Design. To have robust performance, we can have distinct frequency distributions between the two signal waveforms such that the frequency distributions of both EM pulse sequences should not overlap. Thus, there is a system design goal to choose the appropriate time period T so as to have distinct waveforms as well as non-overlapping frequency distribution. Generally, an impulse sequence with time period T has a harmonic frequency distribution with components appearing every $F=1/T$[11]. However, a digital binary waveform produces two different EM pulses in terms of its polarity. Taking FIG. 5a as example, when a digital waveform switches voltage from 0V to 3.3 V, it generates a positive EM impulse response. Similarly, when the voltage is changed from 3.3 to 0V, it emits a negative EM impulse response. The blue dot line in FIG. 5a is a digital waveform in GPIO pins by setting a PWM waveform with 50% duty cycle and time period T=4.3 μs, while the blue line is the corresponding EME RF signals emitted from the GPIO pins. FIG. 5b applies a PWM signal with 29% duty cycle and time period T=5.3 μs. The different PWM configuration in terms of time period and duty cycle made both have different frequency distribution as illustrated in FIG. 5c. To further illustrate how the frequency distribution depends on the time period as well as duty cycle, we denote the positive EM impulse response and negative EM impulse response as p(t) and n(t) respectively while using T to denote the frequency of PWM and a for the percentage of PWM as well as duty cycle. One should also notice that n(t)=−p(t) due to the same magnitude of voltage change from low to high and high to low. Then, any EM signal emission through periodically varying digital waveform x(t) and its frequency distribution X(f)=FFT{x(t)} can be described as below $$x(t): p(t) + n(t - \alpha T) \overset{FFT}{\leftrightarrow} X(f): P(f) - P(f)\exp(-j2\pi f \alpha T) \quad (1)$$

Where X(f) is the Fourier transform of x(t). The equation (1) can predict the frequency distribution. For example, when α=50%, the f=1/T; 3/T; 5/T, . . . , (2L+1)/T in exp(−j2πfαT) will result in −1 while f=2/T; 4/T, . . . , 2 L/T will make exp(−j2πfαT)=1. Hence, in FIG. 5(a), the even frequency bins of PWM cycle 233 kHz will have no energy distribution while only odd frequency bins of 233 kHz cycle can have energy due to using 50% duty cycles. One can notice that there is a small energy remaining at 233 kHz× 8=1.86 MHz. This is because a few of the negative EM pulses may have smaller magnitude as compared to the positive EM pulses. FIG. 5)(b) shows the PWM with corresponding EM signal when the frequency rate is 189 kHz with 29% duty cycle. The alpha=29% will not induce exp (−j2πfαT) as 0 for most even harmony frequency such as f=2/T; 4/T, . . . , 2 L/T. One can see the 7th harmonic frequency bin at 1.32 MHz has no energy, and this is because having alpha=0:29 results in the smallest magnitude distribution at that frequency bin. In short, the time period T dictates the harmonic frequency distribution while the duty cycle, α, determines how the energy is distributed among those harmonic frequency bins. Generally, 50% has the smallest number of harmonic frequency bins. In our case, there are five harmonic frequency bins for α=50% while there are 8 harmonic bins for a 29% duty cycle. Generally, we can use equation (1) to design the desirable frequency distribution by choosing corresponding duty cycle and time duration.

Unwanted EM Signals Tolerance. Since we adopt a frequency harmonic property to generate a spread spectrum Frequency Shift Keying modulation scheme, the wide band harmonic frequency bins can provide noise tolerance. For example, in FIG. 5)c, there is an unwanted EM noise signal mixing into our frequency observation window. Although one of the harmonic frequency bins at 935 kHz in the data-2 waveform is disturbed by unwanted noise, the other harmonic frequency bins can still assist the receiver to decode the data. Thus, our proposed Spread Spectrum FSK coding technique can provide robust data transmission against ambient EM noise.

Guard Interval and Preamble. We now can embed data as binary 1 and 0 by producing a sequence of waveforms with different duty cycles as well as time periods. By checking predefined energy distributions in predefined frequency bins, the decoder can decode EM signals into binary data. To further assist the decoder in knowing the boundary of each sequence of EM pulses, we add a guard interval for time synchronization between each of the EM sequences. In the guard interval period, the EM transmitter will not generate any EM pulses to assist the decoder later in knowing the boundary. Additionally, the EM transmitter will first generate a predefined data format as a preamble to let the decoder know the starting point. In our system, we use '1111' as the preamble.

Although we use a PWM digital waveform as an illustration here, one can also choose the corresponding binary stream (i.e. 000111000 . . . ) in any digital bus such as UART (universal asynchronous receiver-transmitter) or GPIO to construct the desired signal waveform. The overall frequency distribution can be constructed by using the (1).

Spread Spectrum Frequency Shift Keying Decoder

To decode the EM signals, the receiver first needs to decide the boundary of each EM pulse sequence. Since the EM transmitter will use on-and-off states to send the EM preamble, the receiver can use a sliding FFT window to search the boundary. For example, consider a receiver first using an N size of the FFT to transform the time domain EM impulse sequence into the frequency domain. Then, by sliding the FFT window along the time domain to search for the maximal signal in the frequency distribution, the receiver can identify the boundary for further data decoding.

Once the boundary is found, the receiver can start to interpret the frequency distribution as binary data 1 and 0. Then, the receiver can check all predefined harmonic frequency bins for both 233 kHz and 189 kHz first as shown earlier to select the appropriate frequency bins for further processing. The appropriate frequency bin is examined by checking whether the pulse appeared in those predefined frequency bins. For example, in FIG. 5)c, the unwanted EM noise distorts the predefined waveform at the harmonic frequency bin of 935 MHz where the highest peak should only exist at one point while the local area has other peaks from unwanted EM noise. Thus, the harmonic frequency bin at 935 MHz is not viewed as a legitimate frequency bin to be selected, since the receiver has noticed that there are some other EM signals overlapping in that frequency bin. After extracting all the true harmonic frequency bins, the receiver combines all the magnitudes for the same harmonic frequency bins. If the total energy at 189 kHz harmonic is larger than 233 kHz, then the decoder will view this waveform as representing bit 1.

Then, by decoding all bit data and preambles, the receiver is able to truncate the bit sequence to the corresponding correct data format.

Data Rate, Read Range and Performance

In our system, the data rate can be described as shown below $$\text{Data Rate} = \frac{1}{\text{Data Time} + \text{Guard Interval}} \quad (2)$$

The data time is the total execution time for decoding a single bit in our wristband device. The data time contains the sample collection time for the N-point FFT window and CPU execution time for FFT calculation and data decoding. To make it easier for the receiver to decode data, we design the guard interval time to be the same as data time. This guarantees the decoder has enough calculation time to slide the window for finding out the boundary for each bit transmission. Therefore, the data rate is decided by 1/(2× data time). For example, for N=1024 FFT window size, the total data processing time is 1.3 ms in the wristband device. Then, we set the guard interval time to 1.3 ms in the transmitter side, which, for example, may be peripheral devices. Therefore, the data rate is 384 bps when the wristband uses a 1024 FFT window to decode each bit. Generally, if we increase the FFT window size, the data rate is reduced due to longer data time from processing larger FFT window and more data collection. However, the read range can be increasing as well. The idea behind this is that when we increase the FFT window size, the number of EM pulses for each FFT window also increases. Generally, the total energy of EM signals in frequency distribution is based on the number of EM pulses in each FFT window. For example, if we want to sense the EM data transmitted from the foot through our body to the wristband, we can increase the FFT window size to 4096 or more. Thus, there is a trade-off between the data rate and read range. From our experimental measurements, the FFT window size of 1024 can give a good read range for most applications.

Other than the FFT window size, another factor that can affect the data rate is CPU processing time. A 2.3 MSPS sampling rate with 1024 FFT window size only takes 0.4 ms, while a 1024 FFT execution time takes 0.9 ms, occupying a majority of the time consumption. When a faster CPU is used, the data rate can be improved. In addition, a fast ADC can also improve the data rate. For example, using a 10 MSPS sampling rate with 1024 FFT window size only consumes 0.1 ms for data collection. Moreover, in this work we only use two different frequency waveforms for binary data transmission. One can utilize more than two frequencies of the digital waveform to have MFSK modulation rather than using binary FSK such that the data rate is boosted. Therefore, using EM-Comm, it is possible to provide useful data rates when fast ADC, MCU chip, and multiple frequencies are used.

TABLE 1

BER performance for Peripheral Devices based on different read range and data rate

| Data Rage (bps) | LED | | Button | | I/O Line | | |
|---|---|---|---|---|---|---|---|
| | WH | NWH | WH | NWH | WH | NWH | Foot |
| 5.8K | 9.1% | 32.4% | 6.4% | 21.3% | 7.3% | 25.2% | 52.3% |
| 1.4K | 3.4% | 10.2% | 1.1% | 5.6% | 2.1% | 8.4% | 37.2% |
| 384 | 0% | 1.6% | 0.2% | 0.6% | 0% | 1.2% | 11.5% |
| 67 | 0% | 0% | 0% | 0% | 0% | 0% | 1.1% |

Performance and Bit Error Rate

To further test the LED, button and I/O line performance, we used an MCU digital output that connects to either an LED, or a button, where in each case they are connected through a 5 cm long wire. Here we denoted the "wristband hand (WH)" as the user's hand wearing the wristband while using "non-wristband hand (NWH)" for the other free hand. For example, if a user wore the wristband in his/her left hand, the wristband hand is left hand while the non-wristband hand is right. We tested our system performance by touching the LED, button, and a lone 5 cm I/O line. We set the FFT window size as 64, 256, 1024, and 4096 differently such that the corresponding data rate is 5.8K, 1.4K, 384, and 67 bit per second respectively. We also test the performance when user stand on the I/O line device. The overall performance is illustrated in Table 1. When the FFT window size is 64, it has the fastest data rate of 5.8 kbps for transmission. However, it also has the smallest window to collect the EM impulses such that the BER is not as good as the others. When increasing the FFT window size, the data rate is reduced due to having the transmitter sending a much longer EM sequence for each bit transition. However, the BER can be improved along with the read range in terms of how far the touching area can be extended. For example, to reach the read range of one foot away, an FFT window size of 4096 can be considered.

Primitives-II: LCD Screen

Figure 6A:
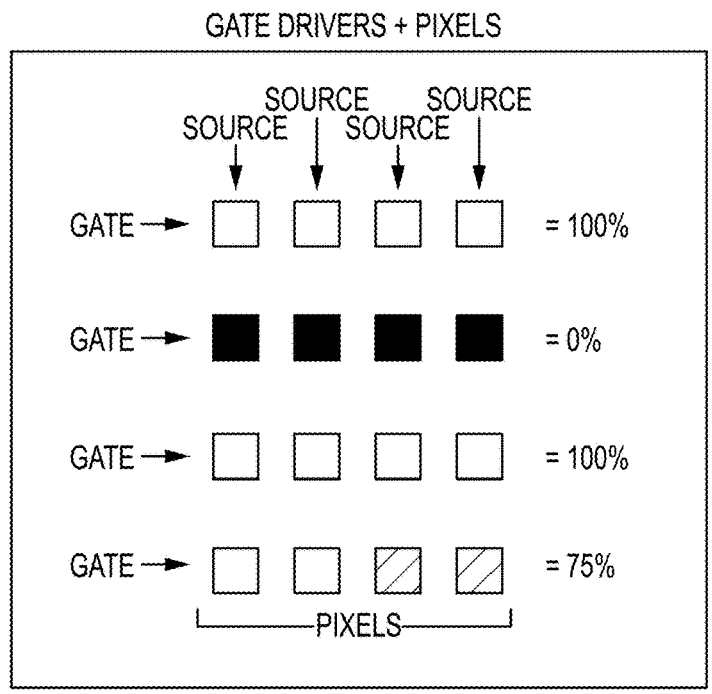
FIGS. 6a-6f show techniques for encoding non-visible information into a displayed image.

A regular LCD or TV screen can be used for data communication purposes by modulating its EM signals. By simply modifying an image with a certain pattern, a user can obtain information directly when touching the screen. For example, in FIG. 4d, a user wearing a wristband device can obtain map information when touching the image. To further describe how we encode data through regular LCD or TV screens, we start by describing the LCD screen design first. A panel LCD screen uses an array of pixels to display images or videos. Each pixel contains three different color channels indicating red, green, and blue (R, G, B) colors. By combining different levels of the red, green, and blue channels, an LED screen is able to present various colors. An LCD screen presents images by first selecting a column of pixel information and then updating each pixel in the column. Each pixel is driven by a source and gate IC. The intensity of colors in the R, G, B channel is relative to the applied voltage magnitude. For example, if an R channel has a maximal magnitude of 255, then the source driver will send the maximal voltage around of 5V to that pixel. A gate driver usually uses more than 20 V as a transition to turn on and off the transistors in the selected column. Thus, the EM signals we are interested in are generated by the gate driver due to its strong signal strength. Moreover, we found that the gate drivers drive different voltages based on the total pixel density in a row. FIG. 6a illustrates that the gate driver enables a column of pixels in an array to be selected for changing information and thus it generates the corresponding EM signals. For example, if all pixels driven by source drivers are white as illustrated in FIG. 6a, first row, then the total brightness of all pixels in the same row have the highest brightness and produce a gate driver with the strongest EM signals. If all the pixels are black in color, as in the second row, the gate driver can use the smallest voltage to enable this row. Thus, the EM signals is at its lowest. If pixels in the same row have two white colors and two gray colors as shown in the last row of FIG. 6a, the total brightness combination therefore is 75% of the whole brightness, thus the EM signal strength will follow this proportion.

Embedding Visible Data in LCD Screen

Since the amplitude of EME signals generated by the gate driver will depend on the whole row's brightness, we can embed information by leveraging this property. Generally, the EM signals emitted from LCD screens mainly have three parts. The first is the EM signals from source drivers, which have very small magnitude and the second component is the EM signals from gate drivers, which, as mentioned, have the largest EM emission due to the high voltage changes in enabling a column of pixels. Finally, the last component of EM signals are the time synchronization control signals, called as HSYNC which appear after all the pixels are updated in each frame.

Figure 6B:
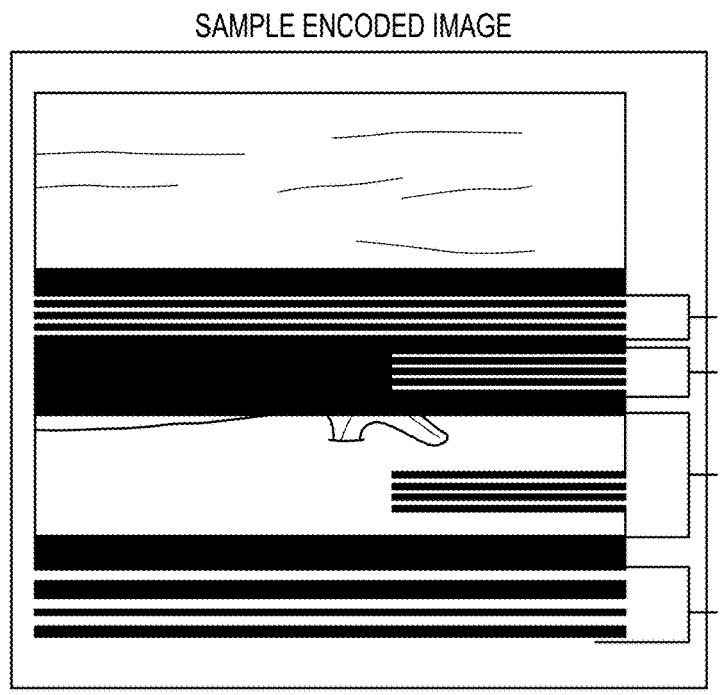
Figure 6C:
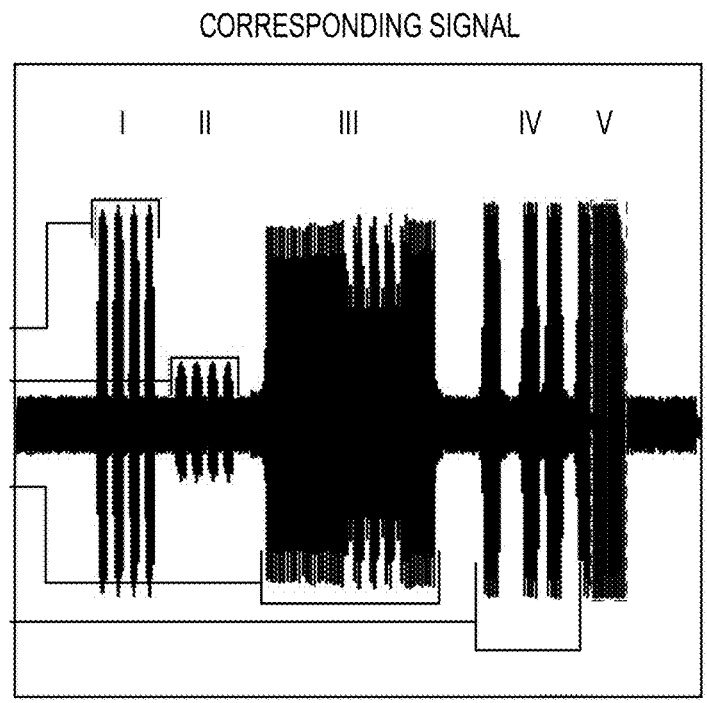
Figure 6D:
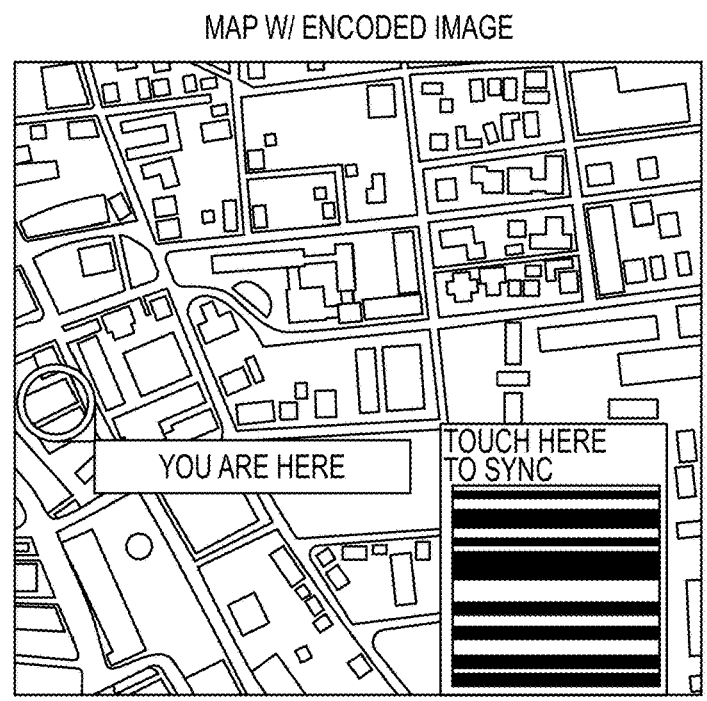
Figure 6E:
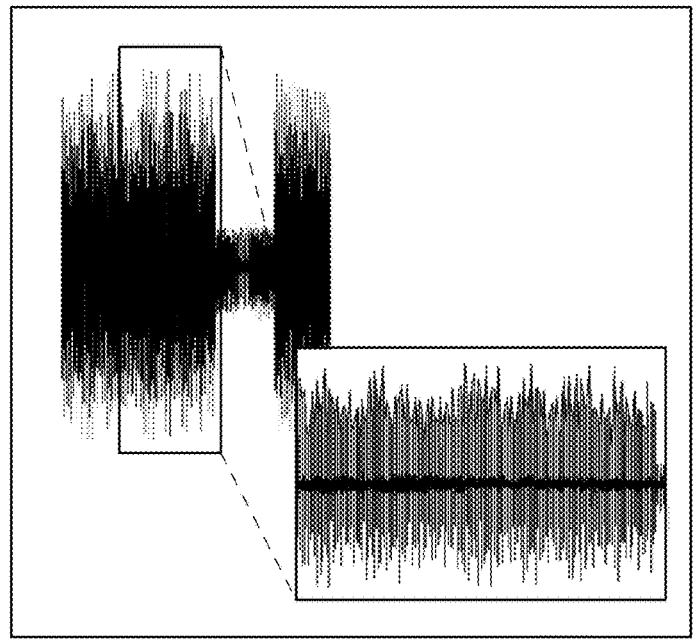
Figure 6F:
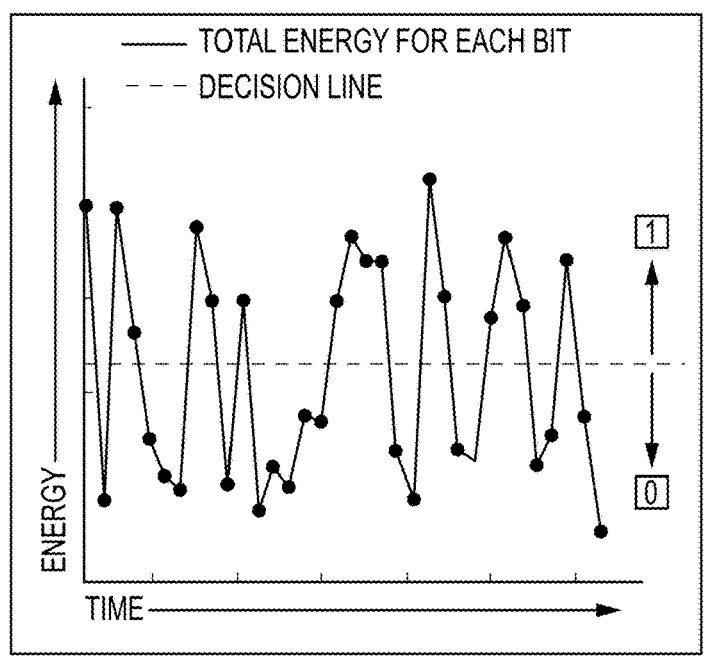

We use a Dell LCD screen 1920×1200 (Model: U2413F) as an example of illustrating how we can encode data using an image. As FIG. 6b illustrates, black and white bars are displayed in the image while FIG. 6c presents the corresponding EM signals along the time axis; the EM signals are measured by using a USRP X310 with 100 MSPS sampling rate. There are five different zones labeled from I to V at panel (c) for example purposes. In zone I, the FIG. 6b first presents whole screen length black and white bars repeatedly four times, resulting in the largest signal amplitude variation as shown in FIG. 6c where there are four individually group of the strongest EM signals. In zone II, when only half screen width rows are used to represent white bars as shown in panel (b), the amplitude variation of EM signals illustrated in panel (c) still preserve the brightness variation but with much small amplitude. In Zone III at panel (b), the black and white bars share the portion of each row with a regular image. In Zone IV, if we choose different bar width in terms of black and white at panel (b), the EM signals will follow the same order in terms of time duration. Finally, in Zone V, the EM signals are from the HSYNC control signals which is not related to pixels information. The HSYNC (Horizontal Synchronization) signals are timing control signals and used for frame synchronization. The HSYNC tells the screen that the current frame is done and to let all source and gate drivers be initialized for the next frame. The EM signals from HSYNC have longer time duration between each EM impulse compared to the EM signals from the gate driver. Namely, the EM pulses from HSYNC are more loosely packed in time while the EM pules from the gate driver are packed more closely to each other. The HSYNC can be used as an indicator to known where the data embedding area is, since all the EM signals appeared with precise timing control and their corresponding order is: EM signals from HSYNC, source, and then gate drivers.

In FIG. 6, panels a, b, and c show the underlying principles of how row brightness affects the electromagnetic noise generated by LCD panels. Panels d, e, and f shows how "visible" data encoding can be used to encode data into the EMI and how that data is processed once received by the wristband device.

Decoding Visible Data in the Wristband Device.

We have illustrated that there is a relation between pixels and EM signals. Now, we use FIG. 6d as example to show how we can encode data in a regular image. Each bit here uses 350×10 pixels as black and white bar to encode "0" and "1" respectively. The 350×10 pixel blocks occupy a 350/1920 portion of each row and 10/1200 portion of each column in screen. These ratios gave the LCD screen room to display any images with negligible disruption from the coding patterns disclosed herein. In here, we encode a total 34 bits as shown in panel (d) where the first 2 bits are used for threshold estimation purposes and the remaining 32 bits are IP address as access token to retrieve the corresponding information from the screen. Panel (e) is the EM signal measured by using a 2.3 MHz sampling rate corresponding to the image in panel (d). The image in panel (d) is 1920×1080 size presented in 1920×1200 screen size and this image size makes the first and last 60 rows of pixels on the screen black. The HSYNC is used here to help the receiver wristband detect the boundary and data embedding areas. The envelope of the data embedding area is extracted in panel (e). Then, by combing the envelope of EM signals for the time duration of every 10 pixel rows, the total energy is therefore as depicted in panel (f), where each amplitude represents a bit. The decision line is calculated by using the first two bits' amplitudes. We chose the decision value by averaging the first two amplitudes which represent bit 1 and 0 used for determining the amplitude difference. Then, the later amplitudes above or below this decision line can be decoded as bit 1 and 0, respectively.

One should notice that, panel (c) preserves the amplitude difference made by using black and white bars while the panel (e) has distortion due to using a slow ADC at 2.3 MSPS, as our wristband device may be equipped with. Although a 2.3 MSPS ADC is not fast enough to capture all the peaks in each EM pulse, the summation of amplitudes in the white bar zones should be larger than in black zones. For example, all the amplitudes of EM signal in 10 pixels row when using white bars have larger signal strength than in the black zone. The distortion introduced by using a slow ADC yields the same effect in black and white zone. The distortion degree of amplitude is random. Hence, if we use more EM signals as well as more rows to represent binary data 1 and 0 (i.e. black and white), the amplitude summation of each area can still reflect the energy difference indicating the binary data 1 and 0. Faster ADCs can usually use fewer rows in amplitude modulation. For example, by using 350×2 rows as white and black for binary data coding, the receiver needs to use an ADC with 100 MSPS to see the amplitude difference. By using 350×6 rows as white and black, the receiver only needs an ADC with 10 MSPS. Thus, by using more rows to represent binary data, the ADC criteria can be relaxed. In addition, if we choose a whole row rather than just a portion of rows such as 1920×6 as white and black, the 2.3 MSPS ADC is also able to decode the data by checking amplitude difference. This is because the amplitude difference from using whole rows of black and white bars is large enough against the 2.3M slow ADC distortion. In short, the distortion due to slow ADCs can be alleviated by using more rows or a higher portion of each row such that the total summation of EM amplitudes has a distinguished difference to help the receiver decode data.

Embedding Invisible Data in LCD Screen

Although we are able to encode data in any images, the previous approaches generate various black and white bars that can be seen by humans. However, we can also embed data by slightly changing the pixel's brightness between each frame such that humans cannot see any encoding information. We leverage the concept that the human eye is not able to perceive small contrast differences. We modify an image by changing the image contrast in the alpha channel. Existing works have shown that by flipping the alpha channel by 3% or less, humans are not able to perceive differences in images nor video. Although these prior works use cameras to decode data, we use the EME property to decode the data. In LCD screens, when displaying the same content, every adjacent frame has the same magnitude but with different polarity in terms of voltage. This is called frame inversion and aims to prevent pixel damage from applying the same voltage over a long time period. The polarity inversion results in every other frame having identical EM signal impulses when the same image is displayed. Therefore, we select every other two frames as pairs to encode data (i.e. 1st and 3rd frames or 2nd and 4th frames) where one frame is used as a ground truth image while the other is used to encode data by changing the contrast. For any still image, we use a 1920×54 pixels block to embed each bit with the 3% brightness enhancement of original images. The brightness enhancement is calculated by using the alpha blending approach as shown below.

$$\text{Brightness Enhancement: } p_{new} = \alpha \times 255 + (1-\alpha) \times p_{old} \quad (3)$$

Where the gold is the original pixel value in terms of R, G, B channel and $p_{new}$ is the new pixels value by increasing a brightness enhancement. For example, if a pixel value in R,G,B as (200, 200, 200), the $\alpha=10\%$ result in a new pixel as (205, 205, 205) which make the pixel brighter. Then, our encoder varies the brightness based on the binary data. When a bit "0" is present, the image is not changed. When a bit "1" is present, a portion of the image is increasing in brightness $\alpha=3\%$ with bar size 1920×54 pixels. A 1920×1200 screen size can embed 22 bits by using a bar size 1920×54 for each bit. Here, we use FIG. 7 as an example illustration. In panel (a), we embed the binary data "0x5C747" with additional two bit "0" and "1" in preposition to the "0x5C747". The first two bits "0" and "1" are used to help the receiver calculate the threshold for decoding the later 20 bits. Once the whole image has embedded the information data by following the binary sequence "0x5C747", our system generates a video by compiling the original images and coding images as following order: "Original, Original, Coding, Coding . . . "

In FIG. 7 an overview is shown of the method used to encode EMI data into LCD screens in a way that is "invisible to the eye". Panel (a) shows how small variations in brightness can be used to encode data into the image in a way that cannot be detected through visible inspection. Panel (b) shows two sequential video frames one with encoded data and the second unmodified frame used as a reference. Panel (c) shows the envelope of the two signals and the resulting difference in amplitude that encodes data. Panel (d) shows the difference between the data frame and the reference frame along the logical decision threshold boundary.

Figure 7A:
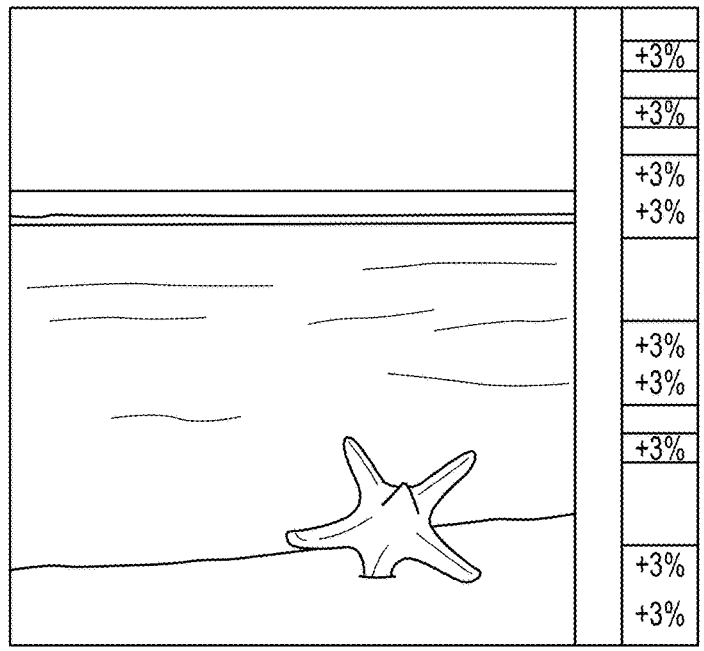
FIGS. 7a-7d relate to an example illustration for demonstrating the techniques for encoding non-visible information into a displayed image.
Figure 7B:
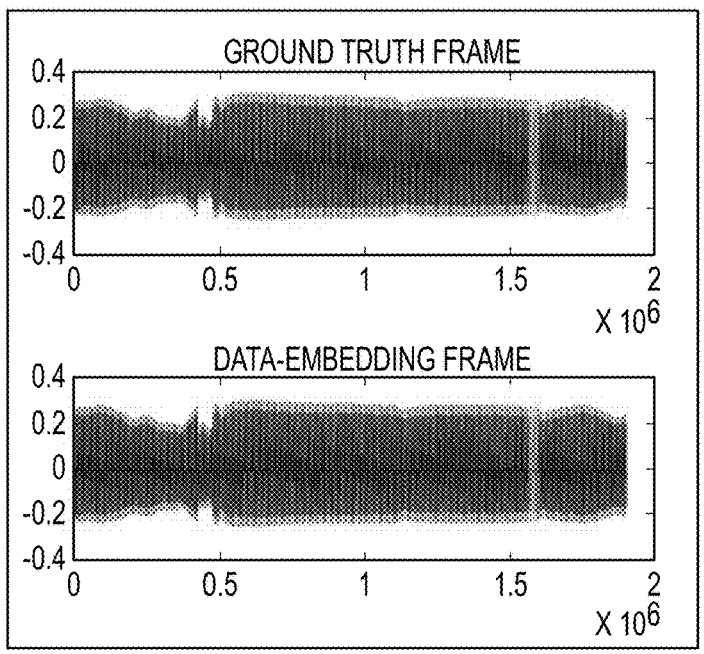
Figure 7C:
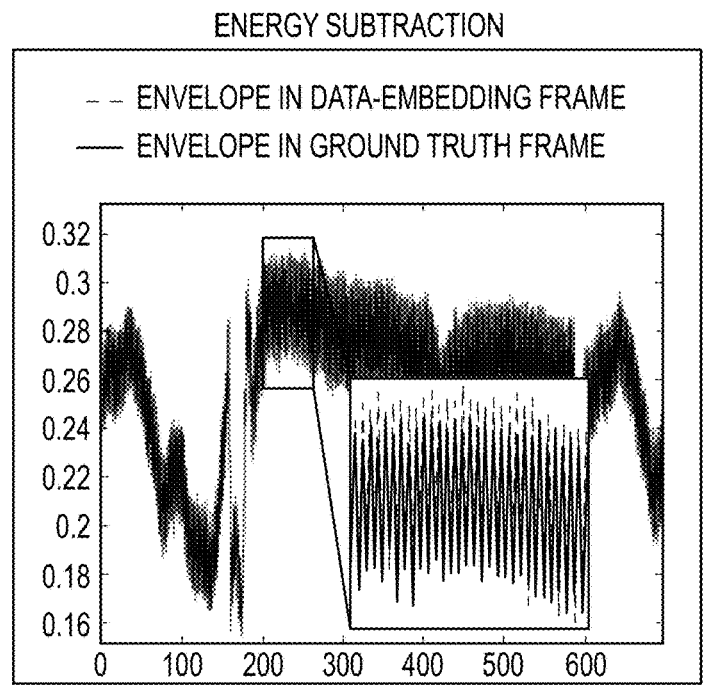
Figure 7D:
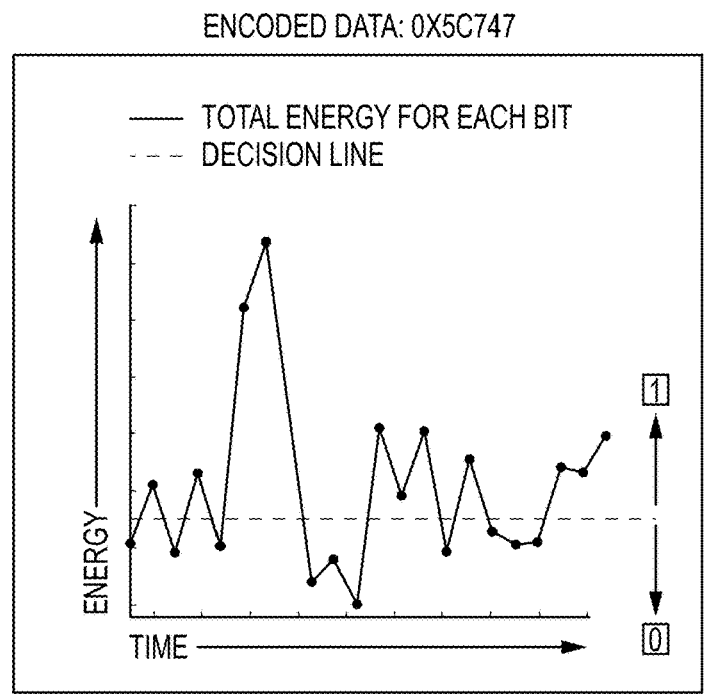

Decoding invisible data in USRP X310. During display of the video on the LCD screen, the human eye is not able to detect the difference across different images and only sees a still image. When a user is touching the LCD screen displaying the invisible coding images, the receiver records all the incoming EM signals. Since there is one unmodified and modified image in every two images repeatedly, the receiver can align all these two images as illustrated in FIG. 7b where the ground truth image represents the original image which does not have any modification, while the data-embedding frame changes a portion of the image's brightness based on the data information. Then, by selecting each frame's EM signal envelope and subtracting from each other, the remaining signal preserves the contrast that we change for data embedding. Since each EM signal only has a slight amplitude increment when increasing tiny contrast such as $\alpha=3\%$, accumulating all the increments in amplitude after subtraction based on each bit range can reflect the data embedding. In panel (d), the total energy after subtracting the ground truth for each bit preserves the brightness variation. The binary decision line is calculated by using the first two accumulation amplitudes representing the bit "0" and "1" which we have used to assist in the receiver decoding procedure. By choosing the middle of the first two amplitudes as a threshold, the amplitude below the threshold will be viewed as bit "0" while the amplitude beyond the threshold will be viewed as bit "1". The remaining 20 bits are decoded correctly as 0x5C747. For the invisible coding scenario, to correctly measure the amplitude, the receiver needs to obtain each peak amplitude of the EM signals. Thus, the ADC we used here for decoding the invisible data is Ettus X310 machine equipped with LFRX daughterboard which has 100 M sampling rate to obtain each peak of EM signals. In the future, it is worth considering the use of a peak detector, which can hold each incoming arrival peak such that the ADC requirement can be reduced down to 2.3 MSPS.

TABLE 2

LCD BER performance

| (a) LCD Visible Data Encoding | | | | (b) LCD Invisible Data Encoding | | | | |
| --- | --- | --- | --- | --- | --- | --- | --- | --- |
| Category | BPF | WH | NWH | Category | Alpha | BPF | WH | NWH |
| 350 × 2 | 600 | 51.2% | 49.3% | 1920 × 10 | 10 | 120 | 0.3% | 0% |
| 1920 × 2 | 600 | 2.4% | 3.3% | 1920 × 30 | 10 | 40 | 0% | 0% |
| 350 × 6 | 200 | 13.6% | 12.8% | 1920 × 54 | 10 | 22 | 0% | 0% |

TABLE 2-continued

LCD BER performance

| (a) LCD Visible Data Encoding | | | (b) LCD Invisible Data Encoding | | | | |
| --- | --- | --- | --- | --- | --- | --- | --- |
| Category | BPF | WH | NWH | Category | Alpha | BPF | WH | NWH |
| 1920 × 6 | 200 | 0% | 0% | 1920 × 10 | 3 | 120 | 41.2% | 42.5% |
| 350 × 10 | 120 | 1.3% | 1.1% | 1920 × 30 | 3 | 40 | 14.5% | 12.3% |
| 1920 × 10 | 120 | 0% | 0% | 1920 × 54 | 3 | 22 | 0% | 1.4% |

Performance

Visible Coding Performance.

In this section, we evaluate our system performance based on different pixel configurations as well as data rates. A user wearing a wristband device on his/her left hand uses different hands to test the system performance in terms of bit error rate. Namely, the wristband hand here is the left hand while the non-wristband hand is the right hand. In addition, we denoted BPF as bit per frame to describe how many bits can be transmitted for each coding frame by adopting 1920× 1200 LCD screen size. For visible coding communication, we test the system performance based on different portions of pixels for embedding data as illustrated in Table 2a. The overall BER regarding wristband hand or non-wristband hand both have similar performance, because the signal strength emitted from LCD screen is able to pass through the whole body. When 350×2 pixels are used to embed binary data 1 and 0, the amplitude difference of EM signals didn't reflect the data information. This is due to the distortion from using a 2.3 MSPS ADC in our wristband device and the amplitude difference that randomly appeared. Thus, the bit error rate is up to 50% which is equal to randomly guessing the binary data. When using a larger portion of pixels in each row such as 1920×2, the amplitude difference made by binary data is detectable against the amplitude distortion from using a slow ADC and the bit error rate is decreased down to around 2%. Using 1920×2 pixels for embedding binary data has much better performance compared to 350×2, but using 1920×2 pixels for embedding each bit does not permit sharing the screen with other images. However, by increasing the portion pixels in each column such as using 350×6 and 350×10, the screen can use the remaining portions for displaying any desired images like the example shown in FIG. 4d. However, the downside is that the bits per frame is reduced to 200 bits and 120 bits respectively. One should notice that when more pixels are used for each bit, the result is that the bit error rate can be improved but the amount of data that can be embedded is reduced and the available space to put any regular image is also reduced. In the future, we will adopt a peak detector to relax ADC criteria such that we can use a very small portion of screen to embed data such as 350×2 pixels for each bit. One can also notice that touching the screen to get the embedded data does not require the user to touch a certain area, since the EM signal is emitted from the whole LCD.

Invisible Coding Performance.

We tested the invisible coding performance with different pixel configurations. The measurement is made by a user wearing a copper-based wristband that is connected to the USRP X310 with a RF cable. The overall performance is shown in Table 2b. When we increase the brightness by choosing α=10%, the remaining amplitude after subtracting the ground truth image is much larger than α=3% such that the bit error is also better. However, the brightness increment yields a noticeable difference to the eye between the normal and modified image. When choosing to increase the brightness using α=3%, the remaining amplitude of EM signals after subtraction is very small compared to the case if α=10%. Thus, when using 1920×10 with α=3% brightness enhancement, the BER for each hand has more than 40% error. This is because the amplitude difference after subtracting the ground truth image is too small to preserve the data information.

When we choose more pixels for each bit such as 1920× 30, the bit error rate can be reduced down to 14.5% in wristband hand. From our experimental results, we found out using 1920×54 pixels to embed binary data '1' and '0' can yield zero error in the wristband hand and negligible error in non-wristband hand. The 1920×1200 LCD size with 1920×54 pixels setting can achieve 22 bits per coding frame. Ideally, a 60 Hz refresh rate screen can produce 30 pairs for data transmission and therefore the data rate can be up to 660 bps.

Primitives-III: Motors and Power Supplies

Figure 4E:
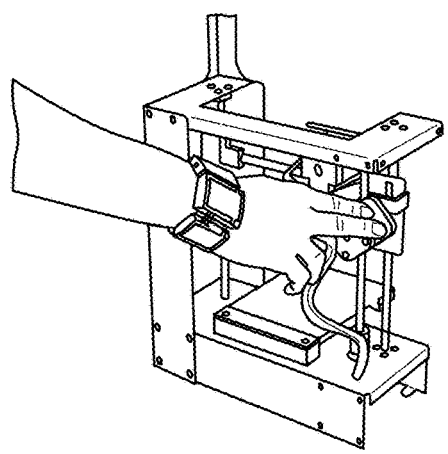
Figure 4F:
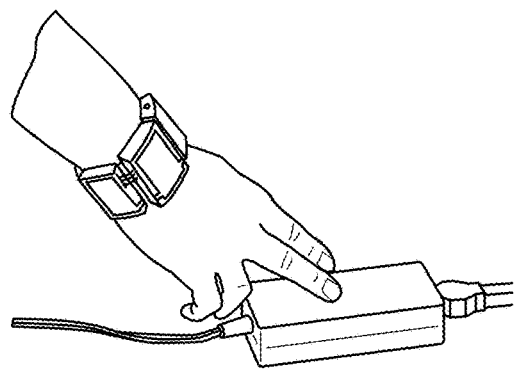

Here, now we consider motors and power supplies as primitives for the system, which can both embed data by switching between different power levels. A user can touch a power adapter or stepper motor to receive the information as illustrated in FIGS. 4e and f.

Motors

Motors are one of the oldest forms of electronic devices and importantly provide large EM signals that can be received over longer distances. Common devices containing motors include power tools and many kinds of transportation vehicles. At the most basic level, motors include inductive coils which produce large magnetic fields. While it is possible to modulate the rate of rotation with brushed DC motors (commonly found in drills), the data rate is rather low due to the mechanical inertia of the motor. A faster method is to energize and de-energize the coil windings quickly to produce EMI. This is easily done with stepper motors since the drivers are already capable of producing pulses to turn on and off coils. In addition, simply energizing and de-energizing the coils produces no movement nor sounds, but instead only induces a large EMI impulse for embedding data. This on/off coding mechanism can be used in all types of motors.

Generally, an energizing and de-energizing encoding approach uses on-off power for encoding. As an example, we use a RepRap 3D printer (SAV MKL), which use a stepper motor. Then, we use the G-code command G17 (Coil is on) and G87 (Coil is off) to generate two different states. When the coil is charged, the stepper motor randomly emits EM impulse signals such that it increases the noise floor as illustrated in FIG. 8a. When the coil is not energized, the EM signals are not emitted and the noise floor is thus low. We define binary bit data as "1" and "0" when turning the coil on and off respectively.

The receiver used an FFT window to calculate the noise floor. When the noise floor is high, the receiver decodes the data as "1". Similarly, when the noise floor is low, the receiver decodes the data as "0". In here, our FFT window size is 512 and our results showing the data embedding is presented in FIG. 8a Stepper Motor as an FFT waterfall plot. The highest data rate we can achieve by using RepRap step motor is around 50 Hz.

Figure 8:
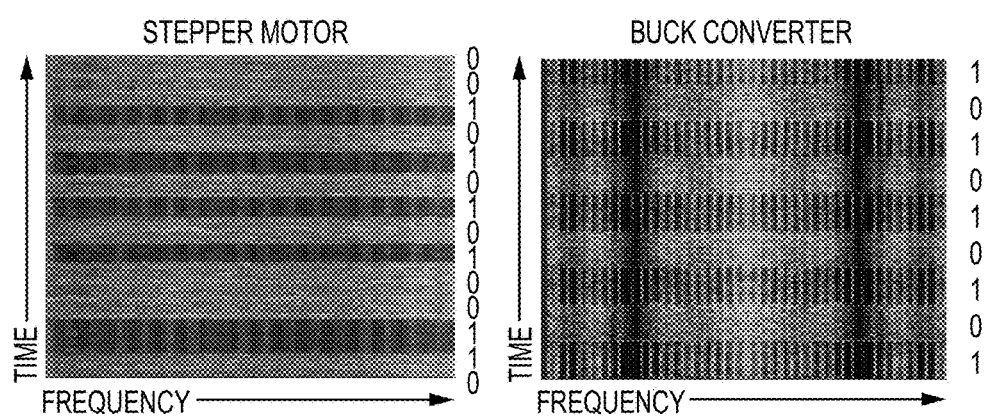
FIG. 8 shows information encoded into the electromagnetic noise emissions from a stepper motor and from a buck converter of a power supply, respectively.

In FIG. 8, FIG. 8a shows a water fall plot of a stepper motor transmitting data via modulated EMI while FIG. 8b shows a waterfall plot of a switch mode power supply (i.e. power brick) transmitting data via its EMI.

Power Supply

Switching-mode power supplies are one of the basic building blocks of electronic devices. They efficiently regulate power from one voltage level to another by dynamically switching current through an inductor, which produces large magnetic fields. This data can travel long distances through the power lines present in homes. An example of this type of signal can be seen in the waterfall plot of FIG. 8b. Thus we can modulate between high and low current loads with different frequencies to embed data 1 and 0, regardless of the device. Here, we chose a regular power supply which takes an AC voltage of 100-240V as input and generates a 12V DC output voltage with maximal current of 1.7 A. Then, we used an HP 6063B DC electronic load machine to act as a host machine such as a computer, which can consume different currents as well as powers. Here, we programmed the host machine consume a 0.1 A and 0.35 A current load repeatedly with 100 Hz switching rate. When the host machine consumes 0.35 A, the EM signals emitted from the power supply have multiple frequency harmonic components. When the host machine consumes a current of 0.1 A, the EM signals don't noticeably have harmonic components and have smaller magnitudes in frequency distribution. Thus, we can embed binary data "0" and "1" by using 0.1 A and 0.35 A respectively.

The wristband device decodes the EM data by checking whether the harmonic frequency distribution is present as illustrated in FIG. 8b which shows signals from a Buck Converter with 512 FFT window size. Given this approach, binary data can therefore be decoded correctly.

Performance

We check the system performance by testing the stepper motor and power supply when using different hands to perform the interaction. Since the EM signals emitted from the power supply and stepper motor are much stronger than emitted from the micro controller I/O line, an FFT window size of 512 is able to decode data without error as shown in the Table 3.

TABLE 3

PowerSupply BulkConverter

| Category | Data Rate (bps) | WH | NWH |
|---|---|---|---|
| Step Motor | 50 | 0% | 0% |
| Bulb Converter | 100 | 0% | 0% |

Figure 9A:
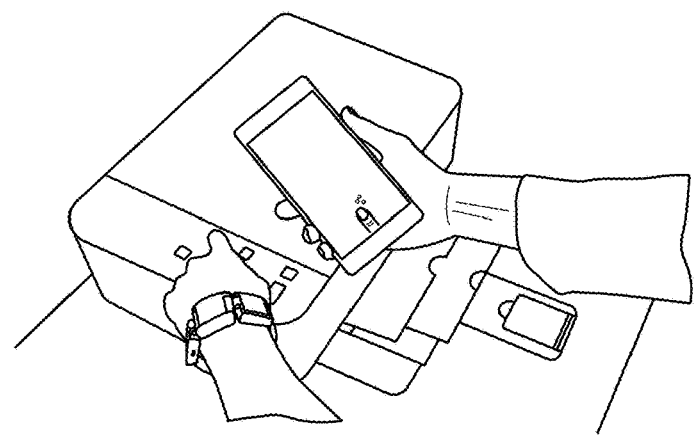
FIGS. 9a-9c show images of three demo applications developed using the technology disclosed herein.
Figure 9B:
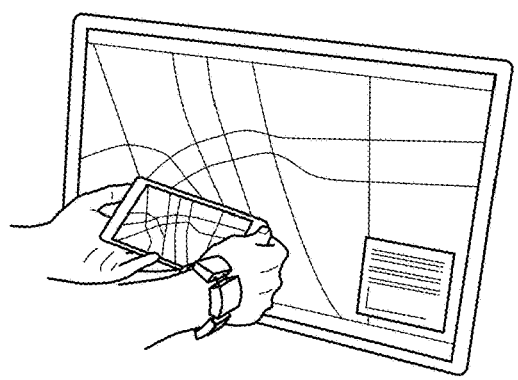
Figure 9C:
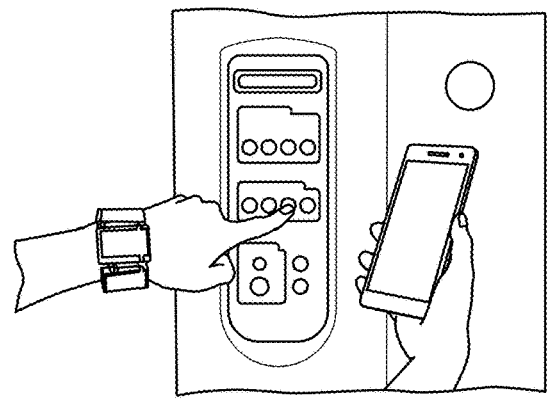

FIG. 9 shows images of the three demo applications developed using our technology. They include, in FIG. 9(a), pairing, trouble shooting, and printing from a Mobile phone; in FIG. 9(b), grabbing a map & directions from a public LCD display and sending them to the user's smart phone; and, in FIG. 9(c) launching virtual tool tips of button functionality on a coffee machine. As can be appreciated, this technology could also be adapted to any electronic device found in the home, workplace, public facilities, factory, etc. This could include a refrigerator, dishwasher, washing machine, clothes dryer, HVAC controls, television or any other entertainment device, any consumer electronics item, etc.

Applications

To demonstrate the utility of the system, we developed a number of applications intended to explore the types of interaction modality enabled by this technology. While these usage scenarios are meant to be illustrative, the underlining technology was developed into fully working demos as shown in FIG. 9.

In the first scenario, visitors looking for a particular building on a large campus are consulting a public display including a LCD screen. Once they have selected the building of interest, an EM-Comm icon is displayed and the user touches the screen to capture the EMI data encoded into the image. The wristband device launches the maps application on the user's phone and the user is directed to the correct building.

Once the visitor arrives, he needs to print a document from his phone, but since he is new to the office he has not connected to the printer before. By touching the print button on the printer, EMI data is transmitted from the printer through his body and into the wrist band, which in turn connects his mobile phone to the printer, in order to send the document. Unfortunately, the printer jams and the alert LED blinks, indicating a problem. In order to gain more information, the user touches the LED which transmits detailed diagnostic information via EMI modulation. A tutorial is then launched on the user's phone, guiding him through the repair process, finally allowing him to print the document.

In the final application, the user is unfamiliar with the office coffee machine. In order to gain a better understanding of its operation, he lightly touches the button which transmits it's functionality via modulated EMI to the wrist band which displays the function of the button on the user phone in his native language. In the following section, we discuss the usage modes that we used to build these example applications.

Pairing

One of the most common, and sometimes tedious, tasks is the pairing of wireless devices. With our system, this process is simplified by leveraging touched based data transfer. For example, consider the case when a user wants to print a document from his/her smart phone on an unknown printer. Once the appropriate document is in the foreground on the smart phone, the user simply needs to press the EM-Comm-enabled "print" button on the printer. This action precisely indicates which device is of interest (i.e. this printer, out of all printers on the network), what action should be performed (i.e. printing), and when it should take place. Using the button primitive and spread spectrum frequency shift keying modulation scheme described above, the printer transmits its IP address along with its make and model through the user's hand and into the EM-Comm wrist band receiver, where it is decoded. This information is then passed onto the smartphone, which makes a connection and prints the document.

Authentication

Most wireless radio systems attempt to transmit data as far as possible, making them vulnerable to eavesdropping. In contrast, EM-Comm-enabled devices offer an extra layer of privacy by only transmitting data through touch. While a sophisticated attacker could use high-end equipment to "sniff" the EMI data emitted by a given device. Due to practical limitations such as the decay of the EMI signal with distance and background noise, this would only be effective up to a few meters, which would require physical access to the target's office or home. When coupled with a layered security strategy, the EM-Comm device can transmit a key on its hidden channel and the EM-Comm wristband device can reply via a public channel such as Bluetooth or WiFi. Furthermore, since both the target device and the wrist band can detect when a user presses one of the target device's buttons, temporal co-occurrence can be used to aid in authentication.

Returning to the previous example, when the users goes to press the "Print" button, the printer is continuously transmitting information like its model number, IP address and button press counter. When the button is pressed, the EMI signal is grounded and disappears. The time of this event and approximate duration is detected by both the printer and the EM-Comm wristband device. Once the button is released, the user's finger will easily remain in contact long enough for the printer to transmit its incremented button press counter, along with secret key. These two unique pieces of information can be used to initiate a secure authentication round.

Enhanced State Indicators

Often times LED indicators are used to provide valuable state information about the device but they are very limited in how expressive they can be (typically only on, off and blinking). While this may be enough if there is proper supporting text written next to the LED, more often than not, users must search internet forms or the manual to decipher their meaning. As sold, the printer used in our example application uses the "Power" LED and "Alarm" LED to denote 45 different error codes (i.e. Support Codes) through a sequence of flashes and pauses. By using our custom EM-Comm device firmware we are able to transmit diagnostic data through the LED via modulated EMI. When the indicator LED is touched by the user, the error codes are sent through the body and decoded by the wrist band and then displayed on a smart phone or computer. Error messages could also take the form of URLs that point to the manufacturer's website for technical support.

Device and Stated Specific Applications

Understanding what devices a user is interacting with and the state of those devices provides a great deal of contextual information about the user intentions. This offers the opportunity to launch device and task specific applications. For instance, in the public display scenario when the user touches the screen and captures the EMI data embedded in the video, the EM-Comm wristband device decodes the data and sends a command to the user's smart phone which launches the maps application. The application is automatically populated with the location shown on the public display and the phone starts directing the user to his/her destination.

Device Selection

An extension of device pairing is device selection through physical interaction. In this scenario, a group of people are deciding where to go for dinner. One person wants to send info on a restaurant from her phone to a subset of the group of friends standing in front of her. Here she touches her smart phone which is modulating the EMI from its LCD screen to encode a pointer to the selected content. She then specifies which of her friends should get the directions by touching their smart phones. In this scenario the friend's phone would be modulating its screen to encode its IP address in its EMI. This data would be received on physical contact and location data would be transmitted via the internet.

EMI Steganography

Steganography is the practice of hiding data inside other forms of data. One typical example is hiding text in an image file by encoding the text in the least significant bits of the pixel's RGB values. If done correctly this manipulation is imperceptible by people. As described above, it is possible to embed data in a video such that it will manipulate the row and column drivers of the display to emit modulated EMI data. This would allow digital content to be "water marked" such that it allows a user to retrieve data when touching the screen such as movie metadata or pointers to web based content.

Tool Tips & Tutorial

Despite the best efforts of the manufacturers of appliance and devices, the symbols used for buttons can be confusing and the text may not be in the language the user understands. To explore this scenario, we augmented an office coffee machine to provide EMI encoded data through its capacitive touch buttons. Here, when a user hovers over the button, the coffee machine transmits the function (e.g. tool tip) of the button via modulated EMI, and the EM-Comm wristband device sends the translated text to the user's smart phone. This tool tip functionality can be applied to any situation where limited user interface needs to be augmented with extra information. Likewise, EMI data transmitted through the buttons could be used in concert with a mobile phone, to help guide a user through a tutorial on how to use the an appliance or device.

Figure 10:
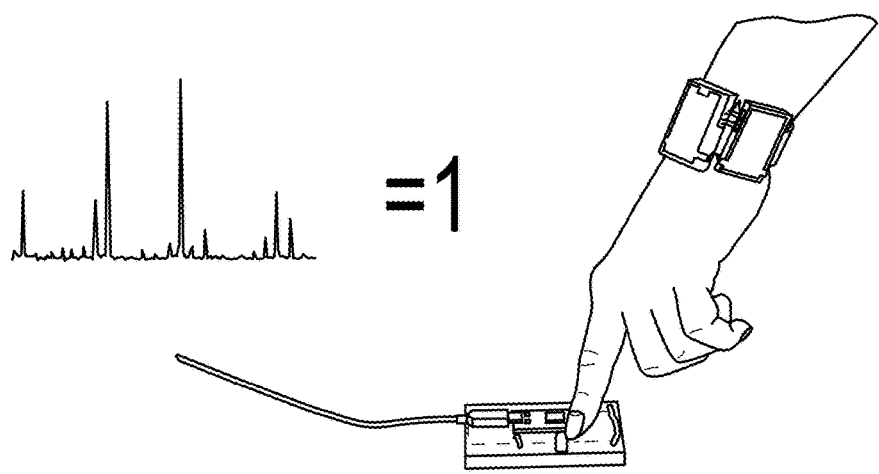
FIG. 10 shows a user touching an LED and the wristband device receiving an EME pattern that represents a logical one.
Figure 11:
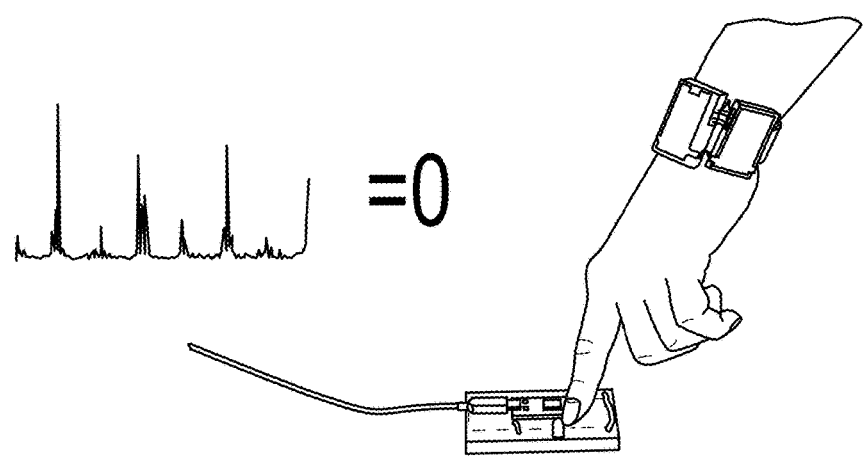
FIG. 11 shows a user touching an LED and the wristband device receiving an EME pattern that represents a logical zero.

A general overview provides some specific applications and additional details. Many of the devices we interact with on a daily basis lack a rich interface. While not all devices have radios, all electronic devices give off electromagnetic noise. These electromagnetic emissions represent an untapped carrier signal, that if properly modulated can be used to encode data. In this example, we use pulse width modulation to control the brightness of an LED, which in turn emits a small amount of EMI at the driving frequency. While the brightness of the LED appears to be unchanging, we are actually cycling between two different PWM frequencies and using the resultant changes in frequency to encode data. By converting the received signal into the frequency domain we can decode this data by looking at the different frequency distributions. For example, the frequency distribution shown in FIG. 10 represents the binary number one, while the distribution shown in FIG. 11 represents binary zero. Using software in the device with the electromagnetic noise emissions, we can encode data by switching between these two duty cycles at will.

We have developed a smart watch form factor receiver that leverages the body as an antenna to capture the near-field EMI noise emissions on touch. Our smart watch includes a high-gain inverting amplifier, a micro-controller sampling at 2.3 MHz, and a Bluetooth module for transmitting results back to a host device.

Along with LEDs, we have developed a number of primitives that can be used as building blocks in more complex user interactions. These include buttons, I/O lines, LCD screens, motors, and switch mode power supplies.

Using these primitives we are able to provide a novel user experience simply by updating the software and devices we use every day.

In this example, a user initiates a pairing process with a printer, which is modulating EMI emitted by a button to encode its IP address. On contact, the data is transmitted through the user's body and into the EM:Comm wristband device, which is linked to the user's Smart Phone. Unfortunately, there is an error and the printer's limited user interface makes diagnosing the error message difficult. By touching the error LED, the user would receive repair directions which are displayed on the Smart Phone.

In a second example, a user can grab map directions from a public LCD screen and transfer them to his phone. Black and white lines in the corner of the image allow us to manipulate the EMI generated by the row and column pixel encoders of the display. By increasing the sampling rate of our A/D converter, we are also able to encode data as imperceptible changes in contrast. This allows our images to appear unaltered while still carrying hidden EME data. Ultimately, both of these methods allow us to encode data simply by tuning the video display on the screen rather than through a software update as in the previous examples.

By embedding EMI data and buttons we can introduce tool tip functionality to any machine. In one example, a non-English speaker wants to know what the specific buttons on the coffee machine will do. Using EM:Comm, he simply touches the button to learn that button's specific functionality in his native language. Ultimately, EM:Comm provides a method for enabling wireless communication capabilities on nearly any electronic device by modulating its preexisting electromagnetic emissions with a simple software upgrade or by playing encoded media.

Figure 12:
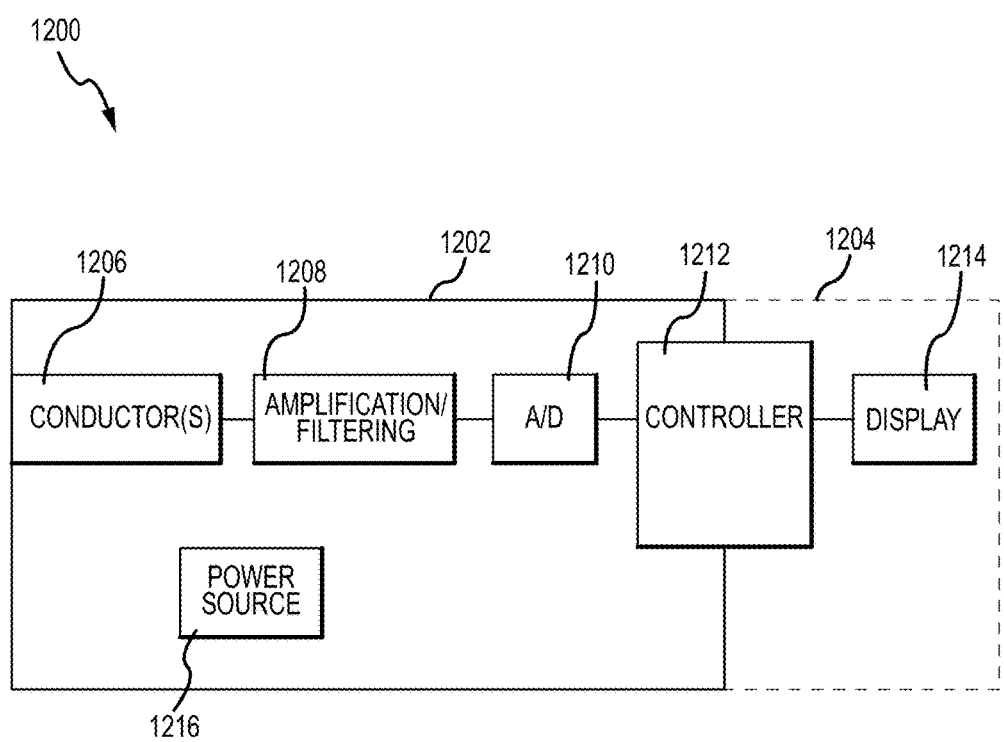
FIG. 12 is a block diagram of the systems taught herein.

A general block diagram of the hardware involved is shown in FIG. 12, in which a system 1200 may be implemented in one integral unit such as an integrated wristband device that has a display, or in a separate wristband device 1202 and a personal communication device 1204 (e.g., a smart phone). Either way, the wristband device can include one or more conductors 1206 designed for direct contact with the skin of a user. The conductors are conductively coupled to an amplification/filtration unit 1208 (which could be as simple as an op amp). The output of the amplification unit 1208 can be provided to an analog-to-digital converter 1210 and the digital output provided to a controller 1212. Of course, the A/D converter could be a part of the controller 1212. Also, the controller could be a single controller or it could be implemented as a plurality of controllers such as a controller in the wristband device 1202 and a controller in the personal communication device 1204. A display 1214 is of course available in the personal communication device 1204. Alternatively, in the integrated wristband device, the display 1214 is available in such a device. One example of an integrated wristband device is a smart watch. Further, in the case of a separate wristband device 1202 and a personal communication device 1204, any suitable communication means (e.g., Bluetooth) could be used for communication therebetween. Also, in the case of the separate wristband device, it could be implemented in a wristband dedicated to only this function, or it could be implemented in a device with other functions such as traditional watch, a smart watch, a fitness monitor, or any other wrist-born object. Further, the device need not necessarily be limited a device worn on the wrist, as it could be worn elsewhere on the body.

Figure 13:
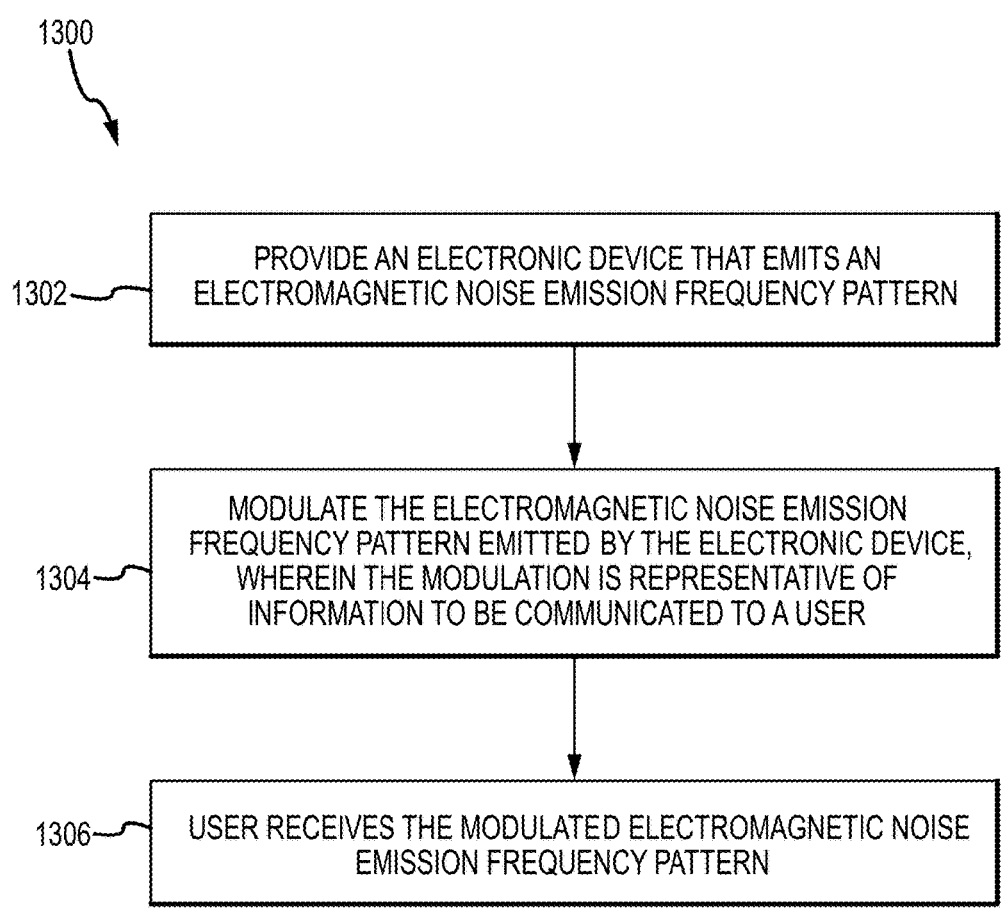
FIG. 13 is a flowchart of a method taught herein.

FIG. 13 shows a method as taught herein. The method 1300 includes the steps of providing (1302) an electronic device that emits an electromagnetic noise emission frequency pattern; modulating (1304) the electromagnetic noise emission frequency pattern emitted by the electronic device, wherein the modulation is representative of information to be communicated to a user; and the user receiving (1306) the modulated electromagnetic noise emission frequency pattern emitted by the device.

Figure 14:
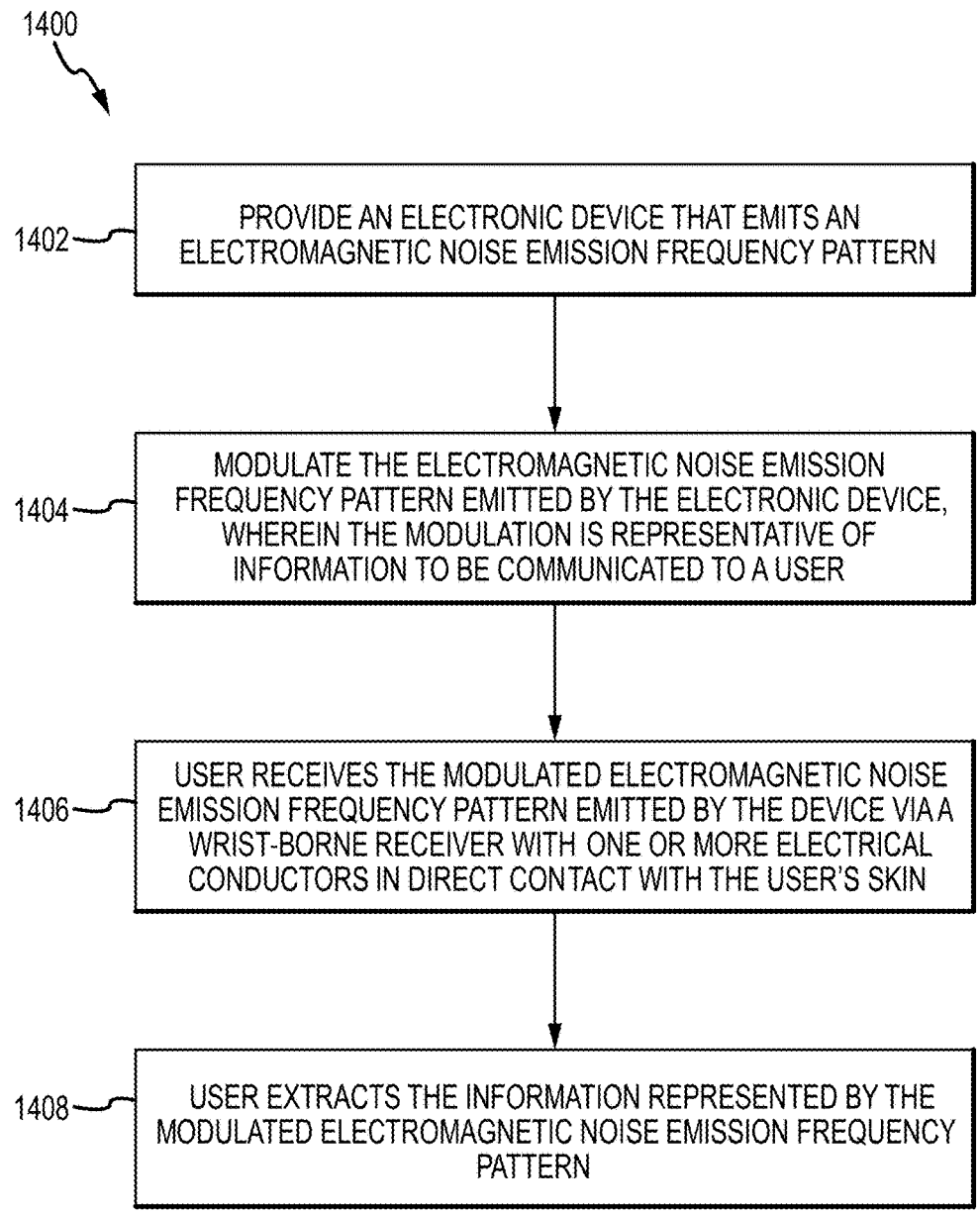
FIG. 14 is a flowchart of a method taught herein.

FIG. 14 shows a method as taught herein. The method (1400) includes providing (1402) an electronic device that emits an electromagnetic noise emission frequency pattern; modulating (1404) the electromagnetic noise emission frequency pattern emitted by the electronic device, wherein the modulation is representative of information to be communicated to a user; the user receiving (1406) the modulated electromagnetic noise emission frequency pattern emitted by the device via a wrist-borne receiver with one or more electrical conductors in direct contact with the user's skin; and the user extracting (1408) the information represented by the modulated electromagnetic noise emission frequency pattern.

CONCLUSION

The way we manipulate and physically interact with our everyday electronic devices encodes a great deal of contextual information about our intentions. For example, pressing the "pairing button" on a Bluetooth peripheral precisely indicates which device is of interest, what action should be performed, and when it should take place. Unfortunately, our mobile computing devices, such as smart phones and smart watches, have very little ability to detect and thus react to these touch interaction events. While systems using RFID tags or body channel communication methods can provide touch based communication they all require the object and/or device of interest to incorporate dedicated radio transmitters or be manually tagged.

In contrast, the EM-Comm system simplifies the deployment scenario by only requiring the user be instrumented with a smart watch form factor receiver. Target devices need no modification or radio hardware of any type. However, they do need to have one of the six basic EMI primitives (i.e. I/O lines, an LED, a button, LCD screens, motors, or a switch mode power supply) whose operation can be modified in software. To enable EM-Comm's touch based wireless communication, the target device only needs a simple software modification where data is encoded into the device's preexisting EMI using our spread spectrum frequency shift keying approach. This is with the exception of the LCD screen, which only needs to play a video or image with EMI data encoded as either visible or invisible changes in pixel row brightness.

Furthermore, the EM-Comm receiver hardware only includes electrodes for coupling to the skin, a low cost operational amplifier for signal gain, and a processor with a low-end analog to digital converter, which makes integration into a production smart watch or wearable device a straightforward process. Ultimately, EM-Comm enables nearly any electronic device to be turned into a touch based radio transmitter with only a software upgrade.

Nearly all electronic devices, regardless of complexity or intended use, are actively transmitting signals in the form of electromagnetic noise commonly referred to as electromagnetic interference (EMI). In this invention we demonstrate that these electromagnetic emissions represent an untapped communication channel, that if properly modulated can turn electronic primitives such as LEDs, buttons, I/O lines, LCD screens, motors and power supplies into radio transmitters capable of wireless communication. All that is needed is software to encode base-band data into the EMI. No additional hardware is required.

Stated simply we can give any electronic device similar functionality to a near-field RFID tag with only a software update.

In order to receive this "EMI data" we have created a simple wrist worn receiver (aka reader) including of a single op-amp and microcontroller, with integrated analog to digital converter to capture and interpret the EMI data. By touching a device of interest, date encoded on top of the EMI (using our Spread Spectrum Frequency Shift Keying modulation scheme) is transfer along the user's body and into our smart watch receiver.

Our Work Makes the Following Contributions:

The use of electromagnetic noise (i.e. EMI) as a carrier signal for data transmission Six electronic primitives that can be used for EMI data transmission including: I/O lines, LEDs, Buttons, LCD screens, Motors, and DC-DC power converters A Spread Spectrum Frequency Shift Keying modulation scheme for encoding and decoding EMI data Two methods for encoding EMI data into video streams that can then be transmitted by LCD screens A wearable smart watch architecture that received EMI through the body for and decode EMI data in real time This information could be a URL that a user's electronic device could go to in order to have access to information relevant to the EM-radiating device, relevant to the location where the EM-radiating device is located, relevant only to a particular user(s), or other. Alternatively, the information provided could be a token. The information could be embedded into the emitted radiation by varying an input or an output to an electronic component in the electronic device. For example, a drive signal to an LED could have a time-varying signal added thereto, in a manner so that the light emitted by the LED does not appear different to the user, but the EM radiation is different, detectable, and usable. Alternatively, the time-varying electronic signal could be a drive signal to a motor or display device or provided at most any I/O port on a microcontroller, or other. Further, when two users shake hands, one or more of the electronic devices worn or carried by either or both of the users could provide information to an electronic device worn or carried by the other user.

The techniques taught herein turn any device into a short-range wireless transmitter with only a modification to its software. Further, these techniques are capable of transmitting arbitrary data via EMI, as compared to merely sensing the presence of a device.

Previous communication protocols start from a position of encoding information onto an intentionally produced carrier. In our case, we are using stray, parasitic transmissions rather than an intentionally produced carrier. Our approach is more computationally difficult to support reliable and error free communication, but it has very little hardware and energy overhead in that we are taking advantage of parasitic behavior.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method, comprising:
providing an electronic device with modifiable software that emits an electromagnetic noise emission frequency pattern with a first state during operations to perform a predefined function;
modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and
the user receiving the modulated electromagnetic noise emission frequency pattern emitted by the device,
wherein the user receives the information represented by the modulated electromagnetic noise emission frequency pattern, and
wherein the modulating includes performing a spread spectrum frequency shift keying method by using two different duty cycles and time periods of electromagnetic interference (EMI) signals for the electronic device.

2. The method as defined in claim 1, wherein the user wears a receiver on the user's wrist that receives the modulated electromagnetic noise emission frequency pattern.

3. The method as defined in claim 2, wherein the receiver is part of a wristband that has one or more electrical conductors in direct contact with the user's skin.

4. The method as defined in claim 2, wherein the information includes information about the electronic device.

5. The method as defined in claim 2, wherein the information includes information associated with an image displayed by the electronic device and wherein the modulating includes modifying operations of gate drivers with time modulation to switch between the first and second states of the electromagnetic noise emission frequency pattern.

6. The method as defined in claim 1, wherein the electronic device includes a display and wherein the software control of the electronic device includes modifying operation of the display to switch between displaying a first image to emit the electromagnetic noise emission frequency pattern in the first state and displaying a second image formed by embedding visible data into the first image to emit the electromagnetic noise emission frequency pattern in the second state.

7. The method as defined in claim 1, wherein the electronic device is a display and wherein the software control of the electronic device includes modifying operation of the display to switch between displaying a first image to emit the electromagnetic noise emission frequency pattern in the first state and displaying a second image formed by embedding invisible data into the first image, via changes in display contrast, to emit the electromagnetic noise emission frequency pattern in the second state.

8. The method as defined in claim 1, wherein the electronic device includes an electrical motor and wherein the modulating comprises energizing and de-energizing oil windings of the electrical motor in a time modulated manner.

9. The method as defined in claim 1, wherein the electronic device is a switched-mode power supply and wherein the modulating comprises switching between high and low current loads with different frequencies.

10. The method as defined in claim 1, wherein the electronic device is a light-emitting diode (LED) and wherein the modulating comprises applying time multiplexing and repeatedly switching between I/O pins connected to the LED.

11. A method, comprising:
providing an electronic device with modifiable software that emits an electromagnetic noise emission frequency pattern;
modulating the electromagnetic noise emission frequency pattern emitted by the electronic device by software control of the electronic device to switch the electronic noise emission frequency pattern between at least two states, wherein the modulating is performed such that data is encoded in the electronic noise emission frequency pattern that is representative of information to be communicated to a user and wherein the modulating includes performing a spread spectrum frequency shift keying method by using two different duty cycles and time periods of electromagnetic interference (EMI) signals;

the user receiving the modulated electromagnetic noise emission frequency pattern emitted by the electronic device via a wrist-borne receiver with one or more electrical conductors in direct contact with the user's skin; and the user extracting the information represented by the modulated electromagnetic noise emission frequency pattern.

12. A method, comprising:

providing an electronic device with modifiable software that emits an electromagnetic noise emission frequency pattern with a first state during operations to perform a predefined function;

modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and the user receiving the modulated electromagnetic noise emission frequency pattern emitted by the electronic device, wherein the user receives the information represented by the modulated electromagnetic noise emission frequency pattern, wherein the user wears a receiver on the user's wrist that receives the modulated electromagnetic noise emission frequency pattern, wherein the information includes information associated with an image displayed by the electronic device, and wherein the modulating includes modifying operations of gate drivers with time modulation to switch between the first and second states of the electromagnetic noise emission frequency pattern.

13. The method as defined in claim 12, wherein the receiver is part of a wristband that has one or more electrical conductors in direct contact with the user's skin.

14. The method as defined in claim 12, wherein the information includes information about the electronic device.

15. The method as defined in claim 12, wherein the electronic device includes a display and wherein the software control of the electronic device includes modifying operation of the display to switch between displaying a first image to emit the electromagnetic noise emission frequency pattern in the first state and displaying a second image formed by embedding visible data into the first image to emit the electromagnetic noise emission frequency pattern in the second state.

16. The method as defined in claim 12, wherein the electronic device is a display and wherein the software control of the electronic device includes modifying operation of the display to switch between displaying a first image to emit the electromagnetic noise emission frequency pattern in the first state and displaying a second image formed by embedding invisible data into the first image, via changes in display contrast, to emit the electromagnetic noise emission frequency pattern in the second state.

17. The method as defined in claim 12, wherein the electronic device includes an electrical motor and wherein the modulating comprises energizing and de-energizing oil windings of the electrical motor in a time modulated manner.

18. The method as defined in claim 12, wherein the electronic device is a switched-mode power supply and wherein the modulating comprises switching between high and low current loads with different frequencies.

19. The method as defined in claim 12, wherein the electronic device is a light-emitting diode (LED) and wherein the modulating comprises applying time multiplexing and repeatedly switching between I/O pins connected to the LED.

20. A method, comprising:

providing an electronic device with modifiable software that emits an electromagnetic noise emission frequency pattern with a first state during operations to perform a predefined function;

modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and the user receiving the modulated electromagnetic noise emission frequency pattern emitted by the device, wherein the user receives the information represented by the modulated electromagnetic noise emission frequency pattern, wherein the electronic device includes a display, and wherein the software control of the electronic device includes modifying operation of the display to switch between displaying a first image to emit the electromagnetic noise emission frequency pattern in the first state and displaying a second image formed by embedding visible data into the first image to emit the electromagnetic noise emission frequency pattern in the second state.

21. The method as defined in claim 20, wherein the user wears a receiver on the user's wrist that receives the modulated electromagnetic noise emission frequency pattern and wherein the receiver is part of a wristband that has one or more electrical conductors in direct contact with the user's skin.

22. The method as defined in claim 20, wherein the information includes information about the electronic device.

23. A method, comprising:

providing an electronic device with modifiable software that emits an electromagnetic noise emission frequency pattern with a first state during operations to perform a predefined function;

modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and the user receiving the modulated electromagnetic noise emission frequency pattern emitted by the device, wherein the user receives the information represented by the modulated electromagnetic noise emission frequency pattern, wherein the electronic device is a display, and wherein the software control of the electronic device includes modifying operation of the display to switch between displaying a first image to emit the electromagnetic noise emission frequency pattern in the first state and displaying a second image formed by embedding invisible data into the first image, via changes in display contrast, to emit the electromagnetic noise emission frequency pattern in the second state.

24. The method as defined in claim 23, wherein the user wears a receiver on the user's wrist that receives the modulated electromagnetic noise emission frequency pattern and wherein the receiver is part of a wristband that has one or more electrical conductors in direct contact with the user's skin.

25. The method as defined in claim 23, wherein the information includes information about the electronic device.

26. A method, comprising:
providing an electronic device with modifiable software that emits an electromagnetic noise emission frequency pattern with a first state during operations to perform a predefined function;
modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and
the user receiving the modulated electromagnetic noise emission frequency pattern emitted by the device,
wherein the user receives the information represented by the modulated electromagnetic noise emission frequency pattern,
wherein the electronic device includes an electrical motor, and
wherein the modulating comprises energizing and de-energizing oil windings of the electrical motor in a time modulated manner.

27. The method as defined in claim 26, wherein the user wears a receiver on the user's wrist that receives the modulated electromagnetic noise emission frequency pattern and wherein the receiver is part of a wristband that has one or more electrical conductors in direct contact with the user's skin.

28. The method as defined in claim 26, wherein the information includes information about the electronic device.

29. A method, comprising:
providing an electronic device with modifiable software that emits an electromagnetic noise emission frequency pattern with a first state during operations to perform a predefined function;
modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and
the user receiving the modulated electromagnetic noise emission frequency pattern emitted by the device,
wherein the user receives the information represented by the modulated electromagnetic noise emission frequency pattern,
wherein the electronic device is a switched-mode power supply, and
wherein the modulating comprises switching between high and low current loads with different frequencies.

30. The method as defined in claim 29, wherein the user wears a receiver on the user's wrist that receives the modulated electromagnetic noise emission frequency pattern and wherein the receiver is part of a wristband that has one or more electrical conductors in direct contact with the user's skin.

31. The method as defined in claim 29, wherein the information includes information about the electronic device.

32. A method, comprising:
providing an electronic device with modifiable software that emits an electromagnetic noise emission frequency pattern with a first state during operations to perform a predefined function;
modulating the electromagnetic noise emission frequency pattern emitted by the electronic device by software control of the electronic device to switch over time the electronic noise emission frequency pattern between the first state and a second state defined by the modifiable software during the operations to perform the predefined function, wherein the modulation encodes data into the electromagnetic noise emission frequency pattern that is representative of information to be communicated to a user; and
the user receiving the modulated electromagnetic noise emission frequency pattern emitted by the device,
wherein the user receives the information represented by the modulated electromagnetic noise emission frequency pattern,
wherein the electronic device is a light-emitting diode (LED), and
wherein the modulating comprises applying time multiplexing and repeatedly switching between I/O pins connected to the LED.

33. The method as defined in claim 32, wherein the user wears a receiver on the user's wrist that receives the modulated electromagnetic noise emission frequency pattern and wherein the receiver is part of a wristband that has one or more electrical conductors in direct contact with the user's skin.

34. The method as defined in claim 32, wherein the information includes information about the electronic device.

* * * * *